(12) United States Patent
Nagaoka

(10) Patent No.: US 6,267,676 B1
(45) Date of Patent: Jul. 31, 2001

(54) GAME MACHINE, IMAGE PROCESSING METHOD FOR USE WITH THE GAME MACHINE, AND RECORDING MEDIUM

(75) Inventor: Yasuhito Nagaoka, Tokyo (JP)

(73) Assignee: Namco, Ltd., Tokyo (JP)

( * ) Notice: Subject to any disclaimer, the term of this patent is extended or adjusted under 35 U.S.C. 154(b) by 0 days.

(21) Appl. No.: 09/576,073

(22) Filed: May 22, 2000

(30) Foreign Application Priority Data

May 28, 1999 (JP) .................................................. 11-150277

(51) Int. Cl.[7] .............................. G06F 19/00; A63B 9/24
(52) U.S. Cl. ..................................... 463/43; 463/1; 463/7; 463/9; 463/31; 463/43; 273/153 R; 273/153 P; 273/153 S; 273/153 J
(58) Field of Search .................................. 463/1, 7, 9, 11, 463/14, 15, 31, 43; 273/148 B, 153 R, 157 R, 153 P, 153 S, 153 J

(56) References Cited

U.S. PATENT DOCUMENTS

| | | | |
|---|---|---|---|
| 5,265,888 | * | 11/1993 | Yamamoto et al. .................. 273/434 |
| 6,093,104 | * | 7/2000 | Kasahara et al. ....................... 463/30 |

FOREIGN PATENT DOCUMENTS

| | | | |
|---|---|---|---|
| 7-227480 | | 8/1995 | (JP) . |
| 8-164270 | | 6/1996 | (JP) . |
| 2784645 | | 10/1996 | (JP) . |
| 10-156044 | | 6/1998 | (JP) . |
| 422000475 | * | 1/1999 | (JP) . |
| 11-197354 | | 7/1999 | (JP) . |

OTHER PUBLICATIONS

Patent Abstracts of Japan, Publication No. 7–227480, published Aug. 29, 1995, English–language abstract attached to reference "AF" above.

Patent Abstracts of Japan, Patent No. 2784645, published Oct. 12, 1996, English–language abstract attached to reference "AF" above.

Patent Abstracts of Japan, Publication No. 10–156044, Jun. 16, 1998, English–language abstract attached to reference "AH" above.

Patent Abstracts of Japan, Publication No. 8–164270, published Jun. 25, 1996, English–language abstract attached to reference "AI" above.

Patent Abstracts of Japan, Publication No. 11–197354, published Jul. 27, 1999, English–language abstract attached to reference "AJ" above.

* cited by examiner

Primary Examiner—Jessica J. Harrison
Assistant Examiner—Yveste G. Cherubin
(74) Attorney, Agent, or Firm—Lyon & Lyon LLP

(57) ABSTRACT

A game machine, an image processing method for use therewith, and a recording medium, which impart a tense atmosphere to a conventional linked puzzle game and dynamic changes in the screen of the game. A character which can be moved by a player is set within a screen. In a case where the character is smashed between a dropping block and a block surrounding the character, the game is terminated, thereby providing a sense of tension to the player. Further, a game screen is scrolled to the direction of which the character moves in association with movement of the character, thereby posing a dynamic change in the screen. In a case where the block that has dropped passes by a position adjacent another block of the same type, the blocks are integrated into a single block, thereby preventing further dropping of the block that has dropped. Thus, the dropping block can be stopped immediately above the character, thereby enhancing the sense of tension of the game to a much greater extent.

14 Claims, 20 Drawing Sheets

GAME MACHINE, IMAGE PROCESSING METHOD FOR USE WITH THE GAME MACHINE, AND RECORDING MEDIUM

BACKGROUND OF THE INVENTION

1. Field of the Invention

The present invention relates to a game machine, an image processing method for use with the game machine, and a recording medium. More particularly, the present invention relates to a game machine, an image processing method for use with the game machine, and a recording medium, wherein an object of operation is moved within a virtual space comprising an object of operation, a plurality of types of dropping objects, and objects surrounding the object of operation.

2. Description of Related Art

A "Link-of-Blocks Video Game Machine" described in Japanese Patent Laid-Open No. 227480/1995 (HEI 7-227480) or a like game machine has already been available as a game machine in which objects, such as blocks, drop. In a game machine of this kind (hereinafter referred to as a "link puzzle game"), the objective of the game is extinction of blocks. When unextinguished blocks are stacked to a predetermined game-over line defined in a game display area, the game is terminated. In order to provide amusement to the player, the game employs a technique of extinguishing blocks in a linked manner. Such a technique provides a mere refreshing sensation to the player when he extinguishes blocks in a linked manner, but fails to provide a sense of tension, which is commonly observed in games other than the link puzzle game.

Further, the conventional link puzzle game is intended to extinguish blocks and offers a stationary game screen which is lacking in dynamic changes.

As set forth, the conventional link puzzle game fails to provide a sense of tension, and game screens are lacking in dynamic changes.

SUMMARY OF THE INVENTION

The present invention has been conceived to solve the problems of the related art and is aimed at providing a game machine, an image processing method for use with the game machine, and a recording medium, wherein an object of operation capable of being moved by a player is set within a screen, the game is terminated when the object of operation enters a predetermined situation, to thereby provide a sense of tension, and a screen can be dynamically changed by means of scrolling the screen of a game in accordance with movement of the object of operation.

According to a first aspect of the present invention, there is provided a game machine which moves an object of operation within a virtual space, the virtual space having the object of operation, a plurality of types of objects to drop and a plurality of types of objects surrounding the object of operation, the game machine comprising: display means for indicating the status of the object of operation and a display area including the object of operation, the plurality of types of objects to drop and the plurality of types of objects surrounding the object of operation in the virtual space; object drop means for causing an object to drop in the virtual space; sandwich-state determination means for determining as to whether or not the object of operation is sandwiched between a dropping object and another object located around the object of operation; linked destruction means for causing a dropping object to destroy surrounding objects in a linked manner, to thereby extinguish the thus-destroyed objects from the display area; object-of-operation movement means for moving the object of operation within the virtual space; and surrounding object destruction means for causing the object of operation to destroy surrounding objects, to thereby extinguish the thus-destroyed objects from the display area, wherein the object of operation is prevented from being sandwiched between the dropping object and another object around the object of operation, and the object of operation is moved in the direction in which an object drops, by means of destroying surrounding objects.

According to a second aspect of the present invention, there is provided an image processing method for use with a game machine which moves an object of operation within a virtual space, the virtual space having the object of operation, a plurality of types of objects to drop and a plurality of types of objects surrounding the object of operation, the method comprising: a display step for indicating the status of the object of operation and a display area including the object of operation, the plurality of types of objects to drop and the plurality of types of objects surrounding the object of operation in the virtual space; an object drop step for causing an object to drop in the virtual space; a sandwich-state determination step for determining as to whether or not the object of operation is sandwiched between the dropping object and another object located around the object of operation; a linked destruction step for causing a dropping object to destroy surrounding objects in a linked manner, to thereby extinguish the thus-destroyed objects from the display area; an object-of-operation movement step for moving the object of operation within the virtual space; and a surrounding object destruction step for causing the object of operation to destroy surrounding objects, to thereby extinguish the thus-destroyed objects from the display area, wherein the object of operation is prevented from being sandwiched between the dropping object and another object surrounding the object of operation, and the object of operation is moved in the direction in which an object drops, by means of destroying surrounding objects.

According to a third aspect of the present invention, there is provided a computer-readable recording medium which has been stored a computer program for executing an image processing method for use with a game machine which moves an object of operation within a virtual space, the virtual space having the object of operation, a plurality of types of objects to drop and a plurality of types of objects surrounding the object of operation, the method comprising: a display step for indicating the status of the object of operation and a display area including the object of operation, the plurality of types of objects to drop and the plurality of types of objects surrounding the object of operation in the virtual space; an object drop step for causing an object to drop in the virtual space; a sandwich-state determination step for determining as to whether or not the object of operation is sandwiched between the dropping object and another object located around the object of operation; a linked destruction step for causing a dropping object to destroy surrounding objects in a linked manner, to thereby extinguish the thus-destroyed objects from the display area; an object-of-operation movement step for moving the object of operation within the virtual space; and a surrounding object destruction step for causing the object of operation to destroy surrounding objects, to thereby extinguish the thus-destroyed objects from the display area, wherein the object of operation is prevented from being sandwiched between the dropping object and another object surrounding the object of operation, and the object of operation is moved in the direction in which an object drops, by means of destroying surrounding objects.

According to a fourth aspect of the present invention, there is provided a computer data signal embodied in a carrier wave, wherein the computer data signal is computer readable program code means for executing an image processing method for use with a game machine which moves an object of operation within a virtual space, the virtual space comprising the object of operation, a plurality of types of objects to drop, and a plurality of types of objects surrounding the object of operation comprising: computer-readable program code means for indicating the status of the object of operation and a display area including the object of operation, the plurality of types of objects to drop and the plurality of types of objects surrounding the object of operation in the virtual space; computer-readable program code means for causing an object to drop in the virtual space; computer-readable program code means for determining whether or not the object of operation is sandwiched between the dropping object and another object located around the object of operation; computer-readable program code means for causing a dropping object to destroy surrounding objects in a linked manner, to thereby extinguish the thus-destroyed objects from the display area; computer-readable program code means for moving the object of operation within the virtual space; and computer-readable program code means for causing the object of operation to destroy surrounding objects, to thereby extinguish the thus-destroyed objects from the display area, wherein the object of operation is prevented from being sandwiched between the dropping object and another object around the object of operation, and the object of operation is moved in the direction in which an object drops, by means of destroying surrounding objects.

According to a fifth aspect of the present invention, there is provided a computer program code embodied on a transmission medium, the computer program code is to execute an image processing method for use with a game machine which moves an object of operation within a virtual space, the virtual space comprising the object of operation, a plurality of types of objects to drop, and a plurality of types of objects surrounding the object of operation, the computer program code comprising: computer program code segment means for indicating the status of the object of operation and a display area including the object of operation, the plurality of types of objects to drop and the plurality of types of objects surrounding the object of operation in the virtual space; computer program code segment means for causing an object to drop in the virtual space; computer program code segment means for determining whether or not the object of operation is sandwiched between the dropping object and another object located around the object of operation; computer program code segment means for causing a dropping object to destroy surrounding objects in a linked manner, to thereby extinguish the thus-destroyed objects from the display area; computer program code segment means for moving the object of operation within the virtual space; and computer program code segment means for causing the object of operation to destroy surrounding objects, to thereby extinguish the thus-destroyed objects from the display area, wherein the object of operation is prevented from being sandwiched between the dropping object and another object around the object of operation, and the object of operation is moved in the direction in which an object drops, by means of destroying surrounding objects.

The above and other objects, effects, features and advantages of the present invention will become more apparent from the following description of the embodiments thereof taken in conjunction with the accompanying drawings.

DETAILED DESCRIPTION OF THE PREFERRED EMBODIMENTS

Figure 1:
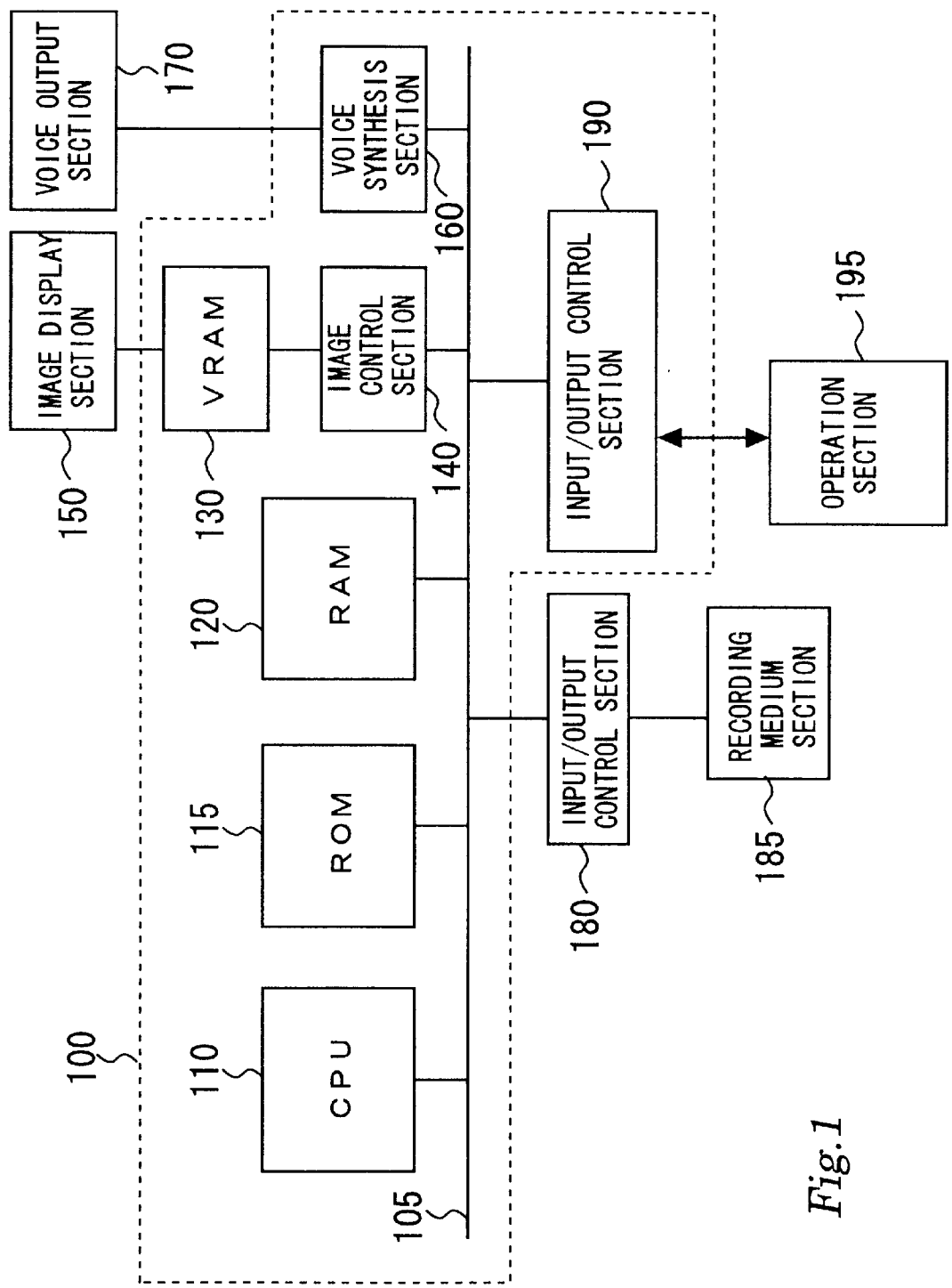
FIG. 1 shows a game machine of the present invention.

Features common to game machines of the preferred embodiments of the present invention are first described by reference to the drawings, and detailed description of each of the preferred embodiments is then provided.

It is noted that the same reference symbols in the drawings denote the same or corresponding components.

FIG. 1 shows a game machine of the present invention. In FIG. 1, reference numeral 100 designates an internal circuit of the game machine according to the present invention; 110 designates a CPU (Central Processing Unit) for executing an image processing method for use with the game machine; 115 designates ROM (Read-Only Memory) reserving data required for initialization of the internal circuit 100 and performing other processing; 120 designates RAM (Random Access Memory) reserving a computer program to be performed by the CPU 110 or data; 130 designates VRAM (Video RAM) which is used as image memory and has a capacity for storing data in a volume sufficient for a single screen of an image display section 150 to be described later; 140 designates an image control section for transmitting to the VRAM 130 numerical data that have been converted into image data; 150 designates an image display section, such as a display, for displaying an image on the basis of the image data transmitted from the VRAM 130; 160 designates a voice synthesis section for generating a synthetic voice; 170 designates a voice output section for outputting the voice synthesized by the voice synthesis section 160, such as a speaker; 195 designates an operation section, such as a controller, by means of which the player (not shown) operates the game machine; 190 designates an input/output control section which is connected to the operation section 195 and controls the input/output of signals; 185 designates a recording medium section into which is to be set a removable recording medium, such as computer-readable CD-ROM (compact disk-read only memory) or a floppy disk (FD) having recorded thereon a program for executing the image processing method of a game machine of the present invention; 180 designates an input/output control section which is connected to the recording medium 185 and controls input/output of signals; and 105 designates a bus for interconnecting the CPU 110, the ROM 115, and the input/output control sections 180 and 190.

A computer program for executing the image processing method according to the present invention is recorded on a recording medium to be loaded into the recording medium section 185. The computer program recorded on the recording medium is loaded into the RAM 120 by way of the bus 105 and over the input/output control section 180. The CPU 110 executes a computer program loaded into the RAM 120. In accordance with the progress of a game, data are input to the CPU 110 from the operation section 195 to the input/output control section 190. Images relating to the current-played game are displayed in the image display section 150, and sounds relating to the same are output to the sound output section 170.

Figure 2:
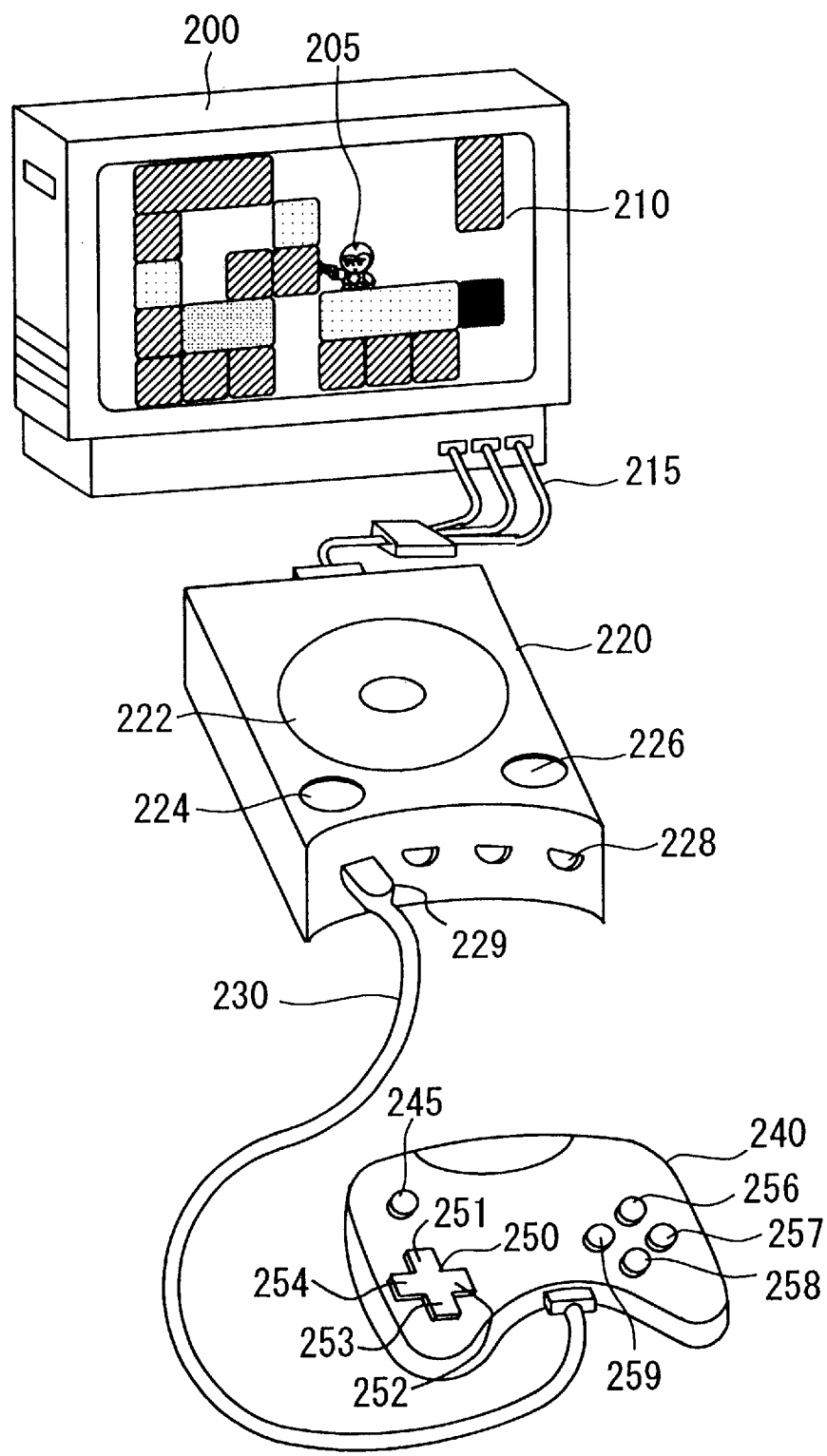
FIG. 2 is a schematic representation showing a game machine according to an embodiment of the present invention.

FIG. 2 is a schematic representation showing a game machine according to an embodiment of the present invention. In FIG. 2, reference numeral 200 designates a display corresponding to an embodiment of the image display section 150; 205 designates an operable character (an object of operation) included in the image indicated on the display 200; 210 designates blocks (objects) included in the image displayed on the display 200; 220 designates a game machine including the internal circuit 100; 215 designates a cable for interconnecting the game machine 220 and the display 200; 222 designates a cover for covering the recording medium section 185 in which is to be set a recording medium, such as CD-ROM; and 226 designates a button for opening the cover 222. The cover 222 is opened by means of pressing the button 226, whereupon a recording medium is set in the recording medium section 185. The cover 222 can be closed upon being depressed. Reference numeral 224 designates a power button of the game machine 220; 240 designates a controller corresponding to one embodiment of the operation section 195 to be operated by the player; 230 designates a cable for interconnecting the game machine 220 and the controller 240; and 228 and 229 designate connection terminals into which controllers are to be connected. FIG. 2 illustrates four connection terminals 228 and one corresponding terminal 229. The cable 230 is connected to the connection terminal 229. The number of connection terminals 228 is not limited to four. Reference numeral 205 designates a direction key for controlling the vertical and horizontal movements of the character 250; 251 designates an UP key for moving the character 205 upward; 252 designates a RIGHT key for moving the character 205 rightward; 253 designates a DOWN key for moving the character 205 downward; 254 designates a LEFT key forming the character 250 leftward; 245 designates a start key for starting or pausing a game; and 256, 257, 258, and 259 designate action keys each having the function of controlling the progress of a game or the action of the character 205.

Embodiment 1

Figure 3:
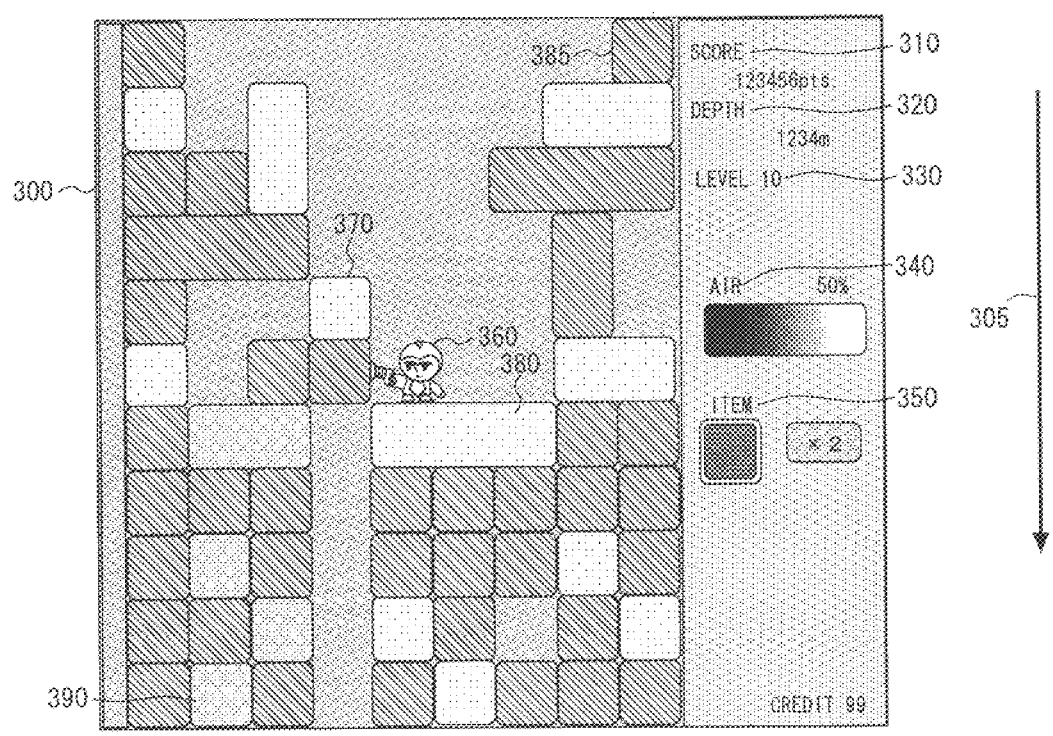
FIG. 3 shows a screen of a game according to the embodiment 1 in the course of being played.

An image processing method for use with a game machine (hereinafter referred to simply as a "game") according to the present invention will now be described. FIG. 3 shows a screen of a game according to an embodiment 1 in the course of being played. In FIG. 3, reference numeral 300 designates a screen appearing on the display 200 (a display area); 360 designates a character (an object of operation); 370, 380, 385, and 390 designate blocks (a plurality of objects surrounding the object of operation); 305 designates a direction in which the block 370 drops; 310 designates a score indication section SCORE for showing the score acquired during the course of the game, for example, 123456 points (pts); 320 designates a depth indication section DEPTH for indicating a depth to which the character 360 proceeds in the direction of drop 305, for example, 1234 m; 330 designates a level indication section LEVEL for indicating the degree of difficulty of a game, for example, 10; 340 designates an AIR level section for indicating the remaining quantity of air which is a parameter for determining a playable game time or the remaining quantity of air available for the character 360, for example, 50%; and 350 designates an item indication section ITEM showing the number of air cylinders or tanks (items) acquired by the character 360, for example, two air cylinders. The screen 300 indicated in the display 200 constitutes a portion of a virtual area (virtual space). As will be described later, the screen 300 is scrolled in accordance with the movement of the character 360, as required, to thereby enable indication of a new portion.

The outline of the game according to the embodiment 1 of the present invention is directed toward how deep the character 360 can move or dig a hole in the direction of drop 305 such that the character 360 avoids the chance of being smashed by blocks (not shown) dropping in the direction of drop 305 or the chance of being sandwiched between dropping blocks (objects) and surrounding blocks (a plurality of types of objects surrounding the character 360). The blocks located in the direction in which the character 360 proceeds are destroyed and extinguished from the screen by means of actuation of the action key 256 of the controller 240. Consequently, the character 360 can move to the position from which blocks are extinguished. When the remaining quantity of air held by the character 360 becomes 0%, the game is over and a sign "GAME OVER" appears on the screen, whereupon execution of the game is terminated. When the character 360 acquires an air cylinder (item) appearing at the position surrounded by blocks, by means of depression of the action key 256, the remaining quantity of air is increased by, for example, 10% of capacity, thus enabling extension of a playable game time. As will be described later, the game may be set according to the type of item such that the game time can be decreased when the character acquires the item. The score of the currently-played game is primarily based on the number of blocks destroyed. However, according to the quantity of air acquired, a bonus score may be added. More specifically, in a case where the remaining quantity of air has reached a value of 95%, if the character 360 acquires an air cylinder, the remaining quantity comes to 105% (=95%+10%), and an excess 5% is added to the score.

Figure 4:
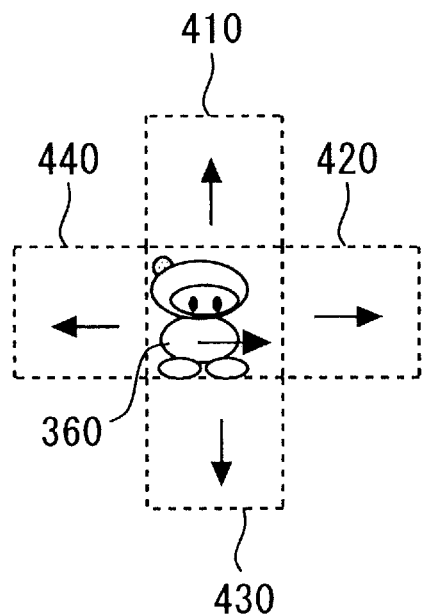
FIG. 4 shows an operation (or means for moving the object of operation) for moving the character 360 according to the embodiment 1.

FIG. 4 shows an operation (or means for moving the object of operation) for moving the character 360 according to the embodiment 1. As shown in FIG. 4, the character 360 is moved in the upward direction 410 when the UP key 251 of the direction key 250 is pressed. When the DOWN key 253 is pressed, the character 360 moves in the downward direction 430. When the LEFT key 254 is pressed, the character moves in the leftward direction 440. When the RIGHT key 252 is pressed, the character moves in the rightward direction 420.

Figure 5:
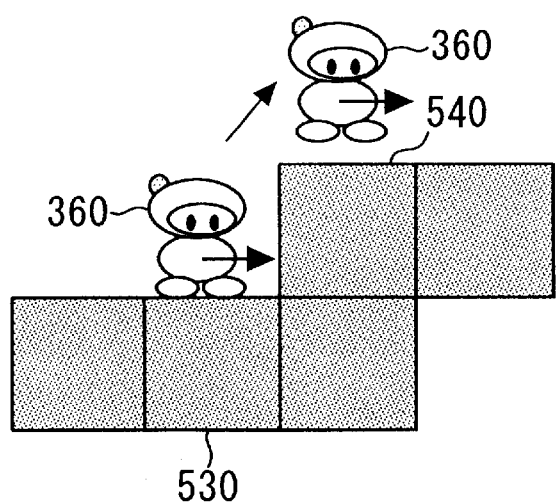
FIG. 5 shows another operation (or means for moving the object of operation) for moving the character 360 according to the embodiment 1.

FIG. 5 shows another operation (or means for moving the object of operation) for moving the character 360 according to the embodiment 1. As shown in FIG. 5, when the UP key 251 and the RIGHT key 252 are pressed simultaneously, the character 360 located on a block 530 can move onto a right block 540. Similarly, in a case where the character 360 is to move leftward and upward, the UP key 251 and the LEFT key 254 are pressed simultaneously, thereby enabling movement of the character 360 onto a left block (not shown). In a case where the left and right sides of the character 360 are surrounded by the blocks 540 or the like, only the RIGHT key 252 is pressed, thereby enabling movement of the character 360 onto the right block 540. Further, pressing of only the LEFT key 252 enables movement of the character 360 onto the left block (not shown).

The display processing (or display means) according to the embodiment 1 enables indication on the display 200 of the state of the character 360 and blocks surrounding the character 360. Further, the state of the character 360; i.e., the depth of the character 360 or the current score, can also be indicated. Specifically, the depth to which the character 360 has moved in the direction of drop 305 is indicated in the display indication section 320, and the score of the game is displayed in the score indication section 310. In the operation for moving the character 360, the character 360 goes outside the screen 300 (i.e., the display area) as a result of movement and travels further in the direction of drop 305 (i.e., a downward direction in the screen 300) or a direction opposite the direction of drop 305 (i.e., a upward direction in the screen 300). In such a case, scroll processing (or scroll means) according to the embodiment 1 enables indication of a new screen by means of causing the screen 300 to scroll in the direction of drop (i.e., a downward direction on the screen 300) or a direction opposite the direction of drop (i.e., an upward direction on the screen 300), in which direction the character 360 located within a virtual display area (virtual space) including the screen 300 moves. As mentioned above, even in a case other than the case where the character 360 moves outside the display area and travels further in an upward or downward direction on the screen 300; that is, a case where the character 360 moves upward or downward on the screen 300, the screen 300 is scrolled in the upward or downward direction in which the character 360 located within the virtual space moves, to thereby enable indication of a new screen. For example, the character 360 moves downward one block, the screen 300 is scrolled one block, thereby enabling indication of an image corresponding to one block located below the original display area.

Figure 6A:
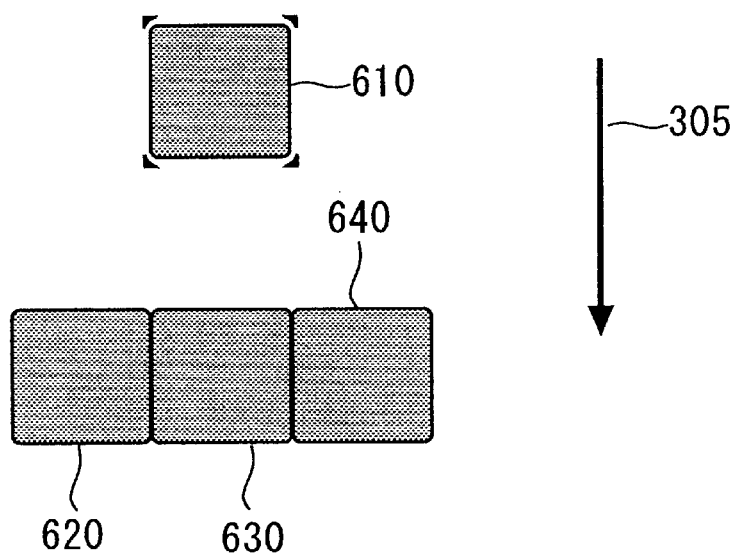
FIGS. 6A to 6C show block drop processing (object drop means) for dropping a block and linked destruction processing (linked destruction means) for destroying blocks in a linked manner.
Figure 6B:
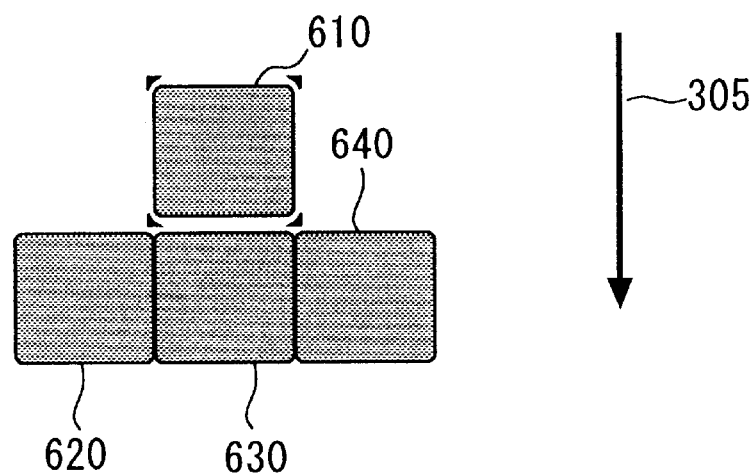
Figure 6C:
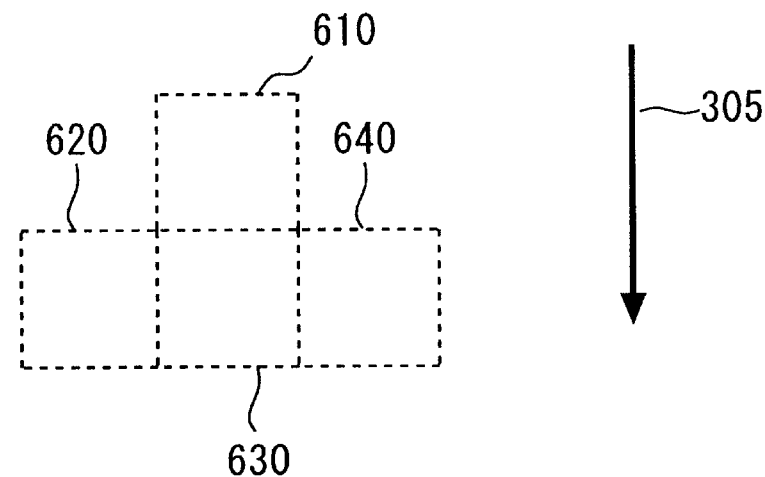

FIGS. 6A to 6C show block drop processing (object drop means) for dropping a block and linked destruction processing (linked destruction means) for destroying blocks in a linked manner. In FIG. 6A, reference numeral 610 designates a block to drop; and 620, 630, and 640 designate surrounding blocks. The block drop processing enables movement of the block 610 in the direction of drop 305. In the block drop processing (object drop means) according to the embodiment 1, dropping of the block 610 occurs in a case where the block 610 drops onto a block 630 as a result of a block (not shown) located between the blocks 610 and 630 being destroyed and extinguished, as shown in FIG. 6A., as well as in a case where the block 610 drops from an elevated position on the screen 300.

Next will be described an operation (or linked-destruction means) for destroying blocks in a linked manner. There are many types of blocks. Throughout the specification, as typified by blocks 385, 370, and 390 shown in FIG. 3, the types of blocks are classified by the types of hatching. The blocks 370 and 380 are of the same type, and the block 370 differs in type from the block 385. Turning again to FIGS. 6A to 6C, since the four blocks 610 to 640 assume the same hatching, they are of the same type. FIG. 6B shows a state in which the block 610 has dropped onto the block 630. As shown in FIG. 6B, if four or more blocks of the same type (i.e., the blocks 610, 620, 630, and 640) are linked together as a result of dropping of the block 610, all the blocks 610 through 640 are destroyed and extinguished from the screen 300 (as designated by broken lines). Such a situation arises not only in a case where the block 610 merely drops from an elevated position on the screen 300 but also in a case where the block (not shown) sandwiched between the blocks 610 and 630 is destroyed and extinguished, as shown in FIG. 6A. Specifically, as a result of destruction of the block (not shown) interposed between the blocks 610 and 630, the block 610 whose support has been lost drops onto the block 630. In this way, destruction of a single block accounts for destruction of another block, thereby enabling linked destruction of blocks (hereinafter, throughout the specification such linked destruction of blocks is referred to as an "avalanche" phenomenon). Although there has been described that blocks of the same type can be destroyed in a linked manner when four or more blocks of the same type are stacked in a linked manner, the description has been provided for only the purpose of illustration. In a case where two or more blocks are linked together, the game can be set such that blocks can be destroyed in a linked manner regardless of the total number of linked blocks.

Figure 7:
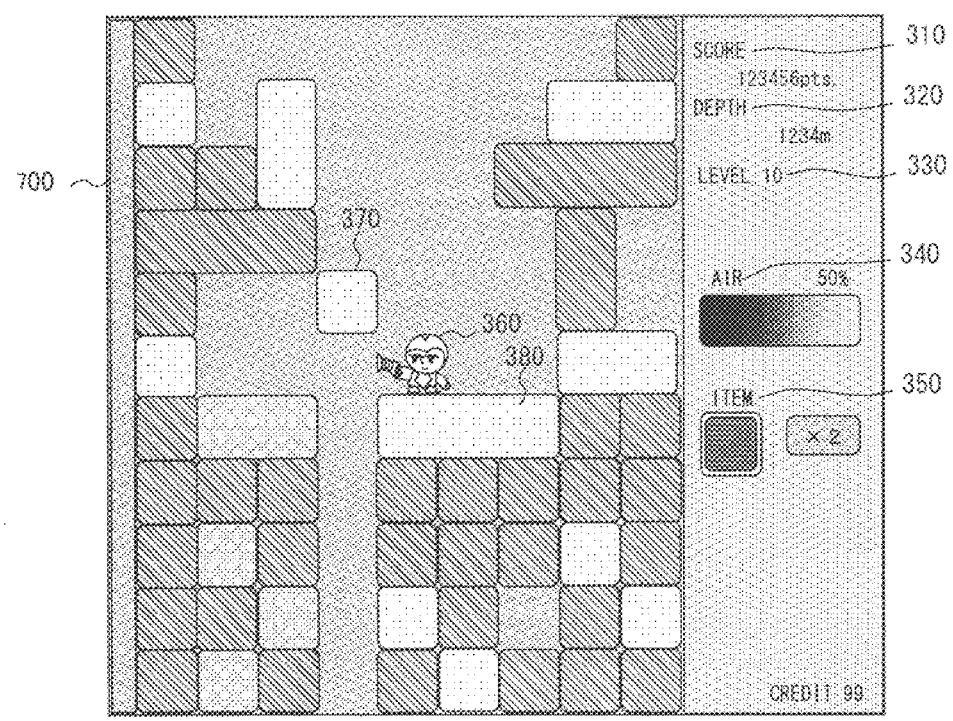
FIGS. 7 shows screens 700 illustrating a round of changes in the avalanche.

FIGS. 7 through 11 show screens 700 through 1100, illustrating a round of changes in the avalanche. In FIG. 7, the character 360 is situated on the block 380, and the block 370 is in the course of dropping from an elevated position on a screen 700. Alternatively, the screen 700 may be considered to illustrate a state in which the block 370 is in the course of dropping as a result of blocks (not shown) located below the block 370 being destroyed by the character 360. The score indication section SCORE 310 indicates "123456 pts" as a score, and the depth indication section DEPTH 320 indicates "1234 m" as a depth. The level indication section LEVEL 330 indicates "10" as a level, and the air level indication section AIR 340 displays "50%" as a remaining quantity of air, and the item indication section ITEM 350 indicates "2" as the number of items. Shades of gray are indicated in a position below the air level indication section AIR 340, in accordance with the remaining quantity of air. In a case where the remaining quantity of air corresponds to a value of 100%, the remaining quantity of air is displayed in black. In contrast, in a case where the remaining quantity of air is 0%, the remaining quantity of air is displayed in white. In a case where the remaining quantity of air assumes an intermediate value between 0% and 100%, the remaining quantity of air is displayed in an appropriate shade of gray. Thus, the remaining quantity of air can be ascertained at a glance.

Figure 8:
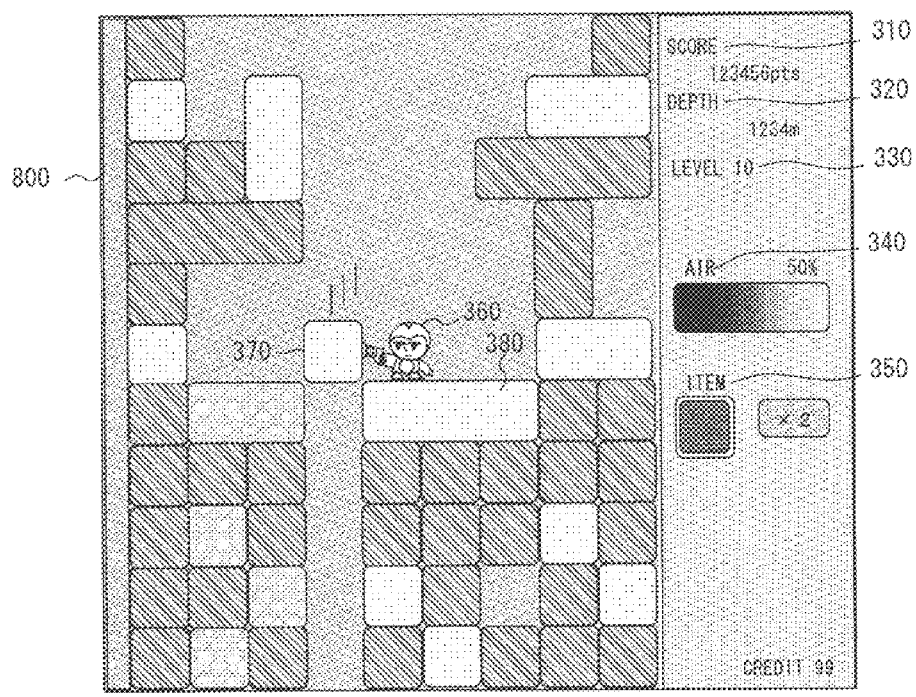
FIGS. 8 shows screens 800 illustrating a round of changes in the avalanche.
Figure 9:
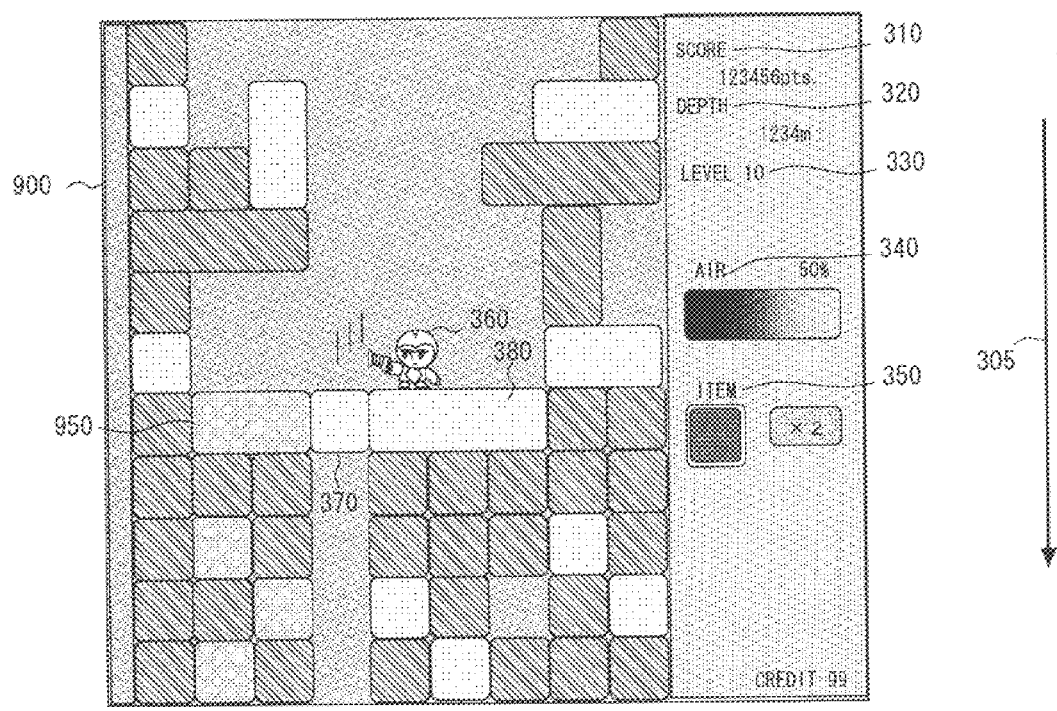
FIGS. 9 shows screens 900 illustrating a round of changes in the avalanche.
Figure 10:
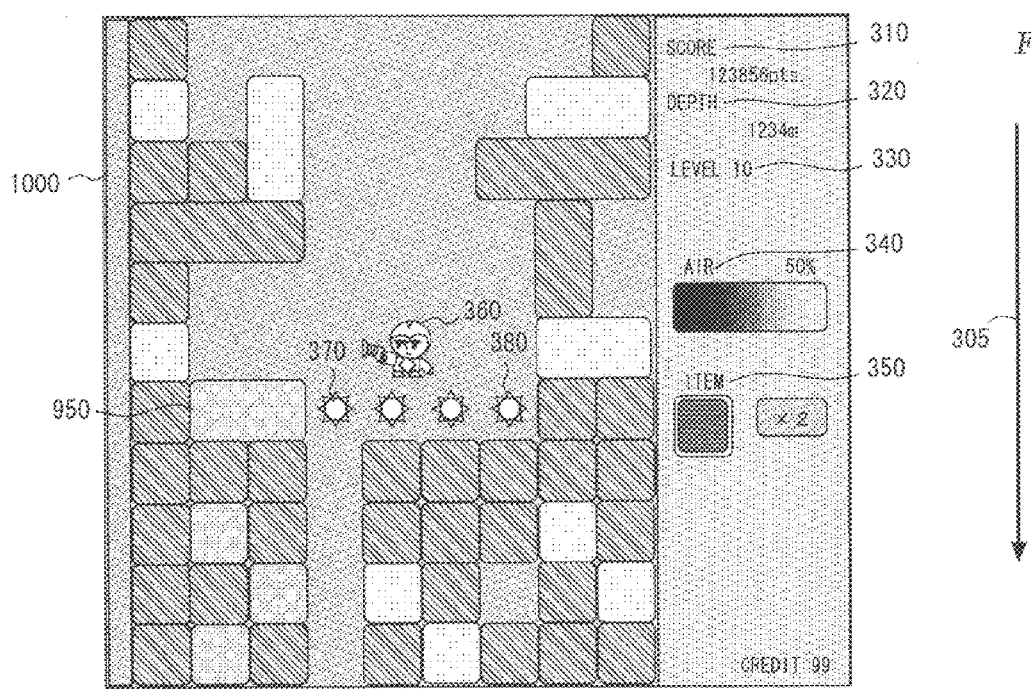
FIGS. 10 shows screens 1000 illustrating a round of changes in the avalanche.
Figure 11:
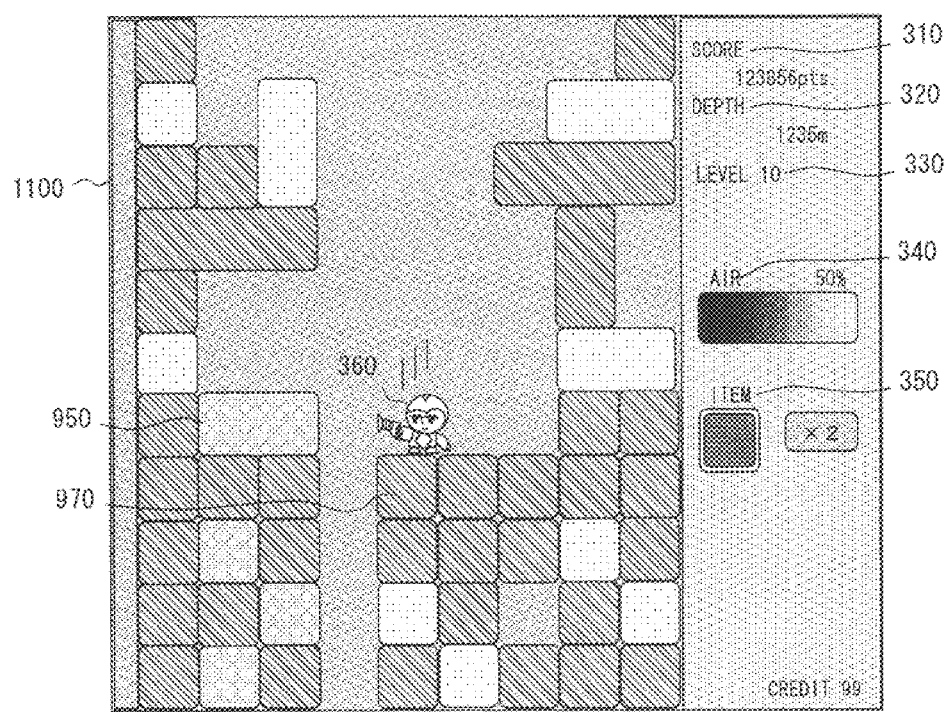
FIGS. 11 shows screens 1100 illustrating a round of changes in the avalanche.

As can be seen from the screen 800 shown in FIG. 8, the block 370 drops in the direction of drop 305. Further, as can be seen from the screen 900 shown in FIG. 9, the block 370 is sandwiched between the block 380 and a block 950. The block 380 corresponds to three blocks integrated into a single block. The block 380 is identical in type with the block 370. A total number of blocks; that is, a sum of the block 370 that has dropped and the block 380 located around the block 370 becomes a value of 4. As shown in FIG. 10, the block 370 and the block 380 are destroyed and extinguished through the foregoing linked destruction processing. As a result, as shown in FIG. 11, the character 360 whose support has been lost drops onto a block 970.

Further, the score of the game can also be increased by means of destruction of a block. The score indication section SCORE shown in FIG. 9 indicates "123456 pts." However, after destruction of blocks, the score indication section 310 shown in FIG. 10 indicates "123856 pts." In the present embodiment, the game is set such that 100 points per block are given to the player at the time of destruction of a block. The setting of points is provided for the purposes of illustration. The number of points assigned to destruction of one block can be set arbitrarily. Further, the depth indication section 320 shown in FIG. 10 indicates "1234 m." As shown in FIG. 11, after extinction of the destroyed blocks, the character 360 drops one block to the block 970. At that time, the depth indication section 320 indicates "1235 m." In the present embodiment, depth per block is set to one meter. However, the setting of the depth is for the purposes of illustration, and the distance of drop per block can be set to an arbitrary number.

Figure 12:
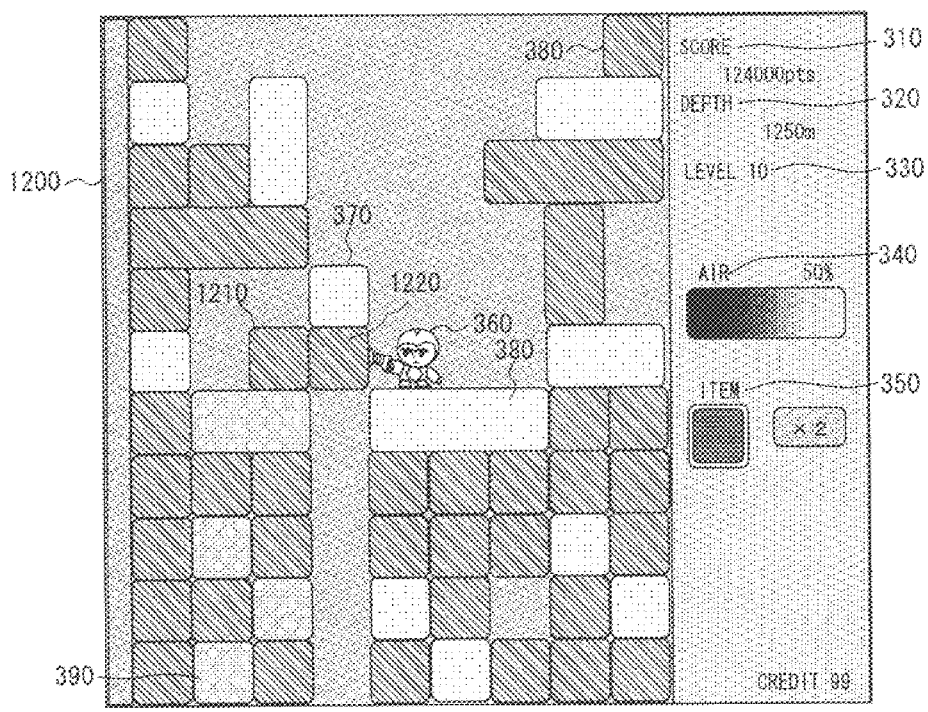
FIG. 12 shows the surrounding destruction processing according to the embodiment 1.
Figure 13:
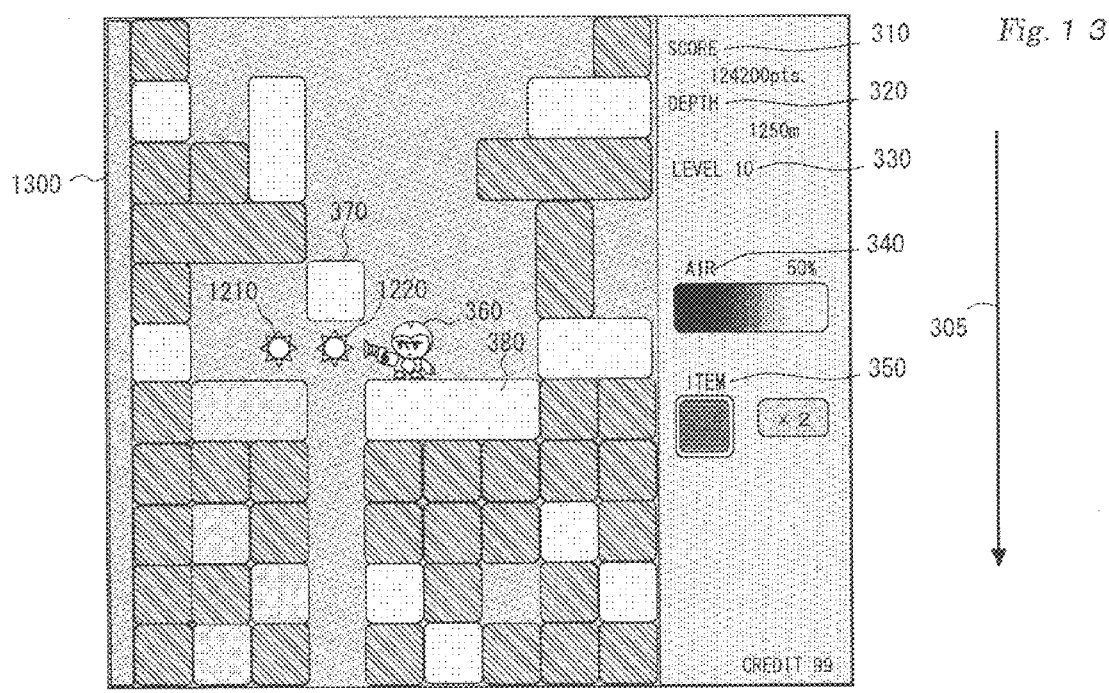
FIG. 13 shows the surrounding destruction processing according to the embodiment 1.

Surrounding destruction processing (or surrounding destruction means) for destroying surrounding blocks around the object of operation according to the embodiment 1 corresponds to an operation for destroying surrounding blocks by means of the player actuating the action key 256. The surrounding destruction operation is one type of avalanche mentioned above. The difference between avalanche based on the linked destruction processing and avalanche based on the surrounding destruction lies in that the surrounding destruction processing is based on the actuation of the action key 256 by the player. FIGS. 12 and 13 show the surrounding destruction processing according to the embodiment 1. In FIG. 12, the character 360 is situated on the block 380 and is attempting to destroy a block 1220. The block 370 is located on the block 1220, and a block 1210 is located on the left side of the block 1220. As shown in FIG. 12, the block 1220 which the character 360 is attempting to destroy is identical in type with the block 1210 located on the left side of the block 1220. As shown in FIG. 13, if the block 1220 is destroyed, destruction of the block 1220 occurs and is followed by extinction of the block 1210 located on the left side of the block 1220, because the block 1210 is identical in type with the block 1220. The score indication section SCORE 310 shown in FIG. 12 indicates "124000 pts." In FIG. 13, in which the blocks 1210 and 1220 have been destroyed, the score indication section SCORE 320 indicates "124200 pts." In the surrounding destruction processing, if a block which is identical in type with the block 1220 destroyed by the player is located within the area adjacent the block 1220 on any side thereof, the block is destroyed. Destruction of blocks of the same type is repeated in a linked manner until further destruction becomes infeasible.

Figure 14:
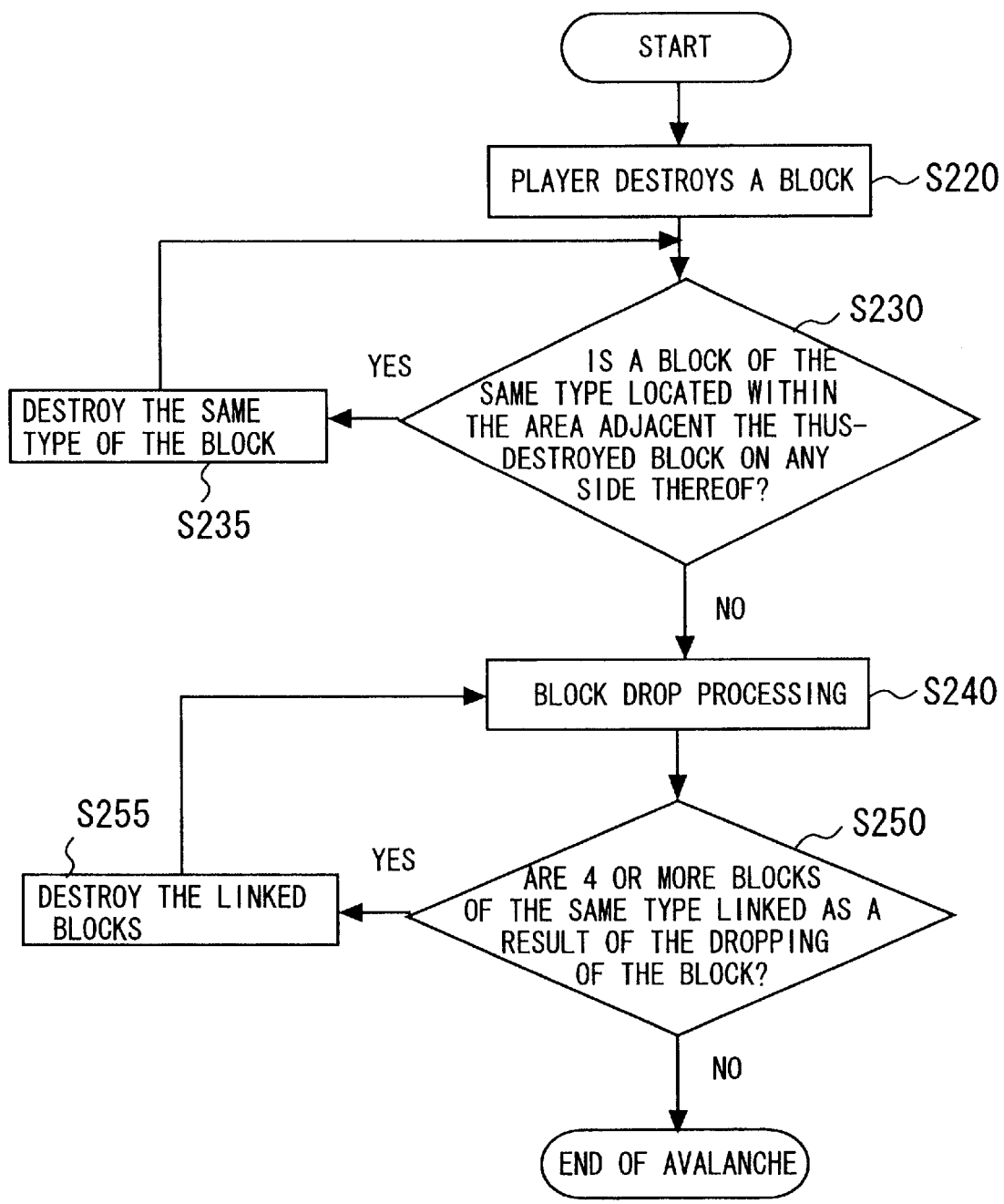
FIG. 14 is a flowchart showing, in the form of a single operation, the foregoing two types of avalanche operations; that is, the surrounding destruction processing and the linked destruction processing.

FIG. 14 is a flowchart showing, in the form of a single operation, the foregoing two types of avalanche operations; that is, the surrounding destruction processing and the linked destruction processing. As shown in FIG. 14, the player destroys a block (in step S220), and a determination is made as to whether or not a block of the same type is located within the area adjacent the thus-destroyed block on any side thereof (in step S230). If such a block (second block) is located within the adjoining area, the second block of the same type is destroyed (step S235). If blocks of the same type still exist within the area adjacent the second block on any side thereof, the blocks are destroyed in a linked manner (operations pertaining to steps S230 to S235 are repeated). If no blocks of the same type are present around the block destroyed by the player, destruction of only a single block occurs. These operations pertain to the surrounding destruction processing.

If no adjoining block is present around the destroyed block, processing proceeds to block drop processing (step S240), including dropping of a block as a result of destruction of the block. A determination is made as to whether or not four or more blocks of the same type are linked as a result of dropping of the block (step S250). If four or more blocks are linked, the blocks are destroyed (step S255). Further, processing returns to the block drop processing (step S240). As a result, so long as four or more block are linked, destruction of blocks is continued, thereby resulting in continuation of the linked destruction processing. When four or more blocks that are linked together do not emerge, the avalanche processing is terminated.

Figure 15:
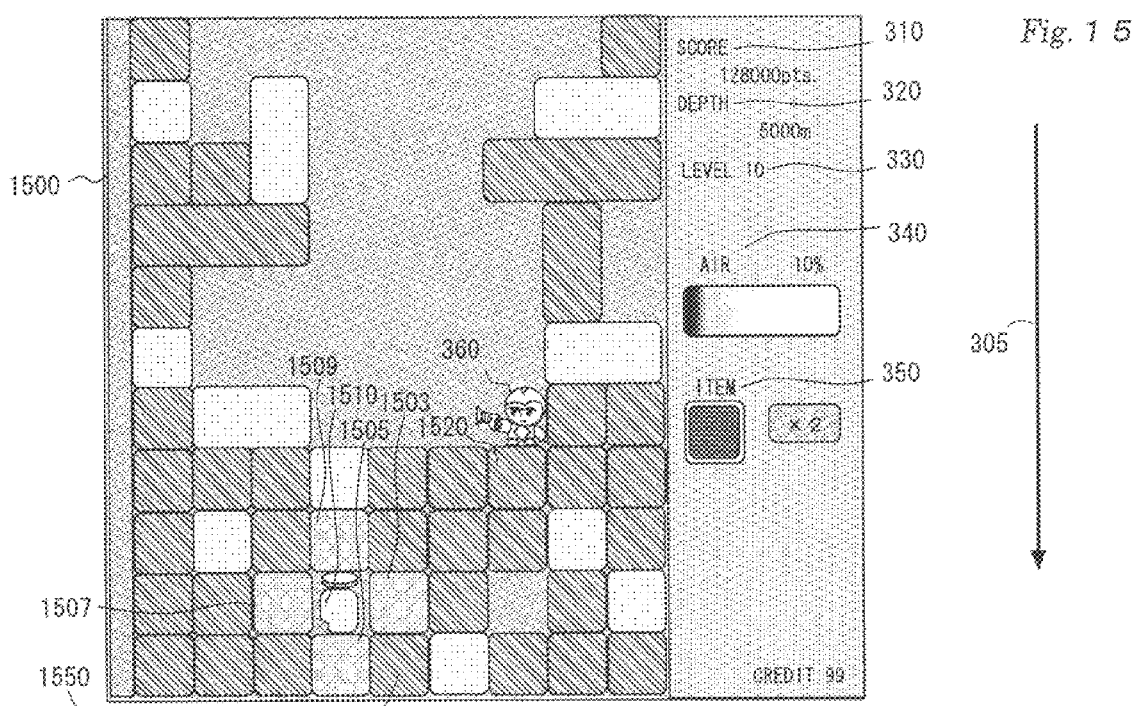
FIG. 15 shows item processing (item emergence means and item acquisition means) according to the embodiment 1.

FIG. 15 shows item processing (item emergence means and item acquisition means) according to the embodiment 1. As indicated by a screen 1500 shown in FIG. 15, an air cylinder item 1510 can emerge at a position surrounded by blocks 1503, 1505, 1507, and 1509 at a predetermined controlled timing. The air cylinder item 1510 can be automatically extinguished upon lapse of 30 seconds after emergence of the air cylinder item 1510. A time limit for extinction can be set to any arbitrary value and is not limited to 30 seconds. In contrast with the other block 370 (hereinafter referred to as a "normal block"), the blocks 1503, 1505, 1507, and 1509 surrounding the air cylinder 1510 (hereinafter referred to as "iron plate blocks") involve air consumption when destroyed. In other respects, the iron plate blocks are the same as the normal blocks. Avalanche processing can be applied to the iron plate blocks. In contrast, the game can be set such that air consumption arises when a normal block is destroyed. In such a case, the quantity of air consumed at the time of destruction of a normal block is preferably set so as to become smaller than that consumed at the time of destruction of the iron plate block. As mentioned above, the air cylinder item 1510 is caused to emerge at the position surrounded by the iron plate blocks 1503, 1505, 1507, and 1509 but may also be caused to emerge at another random position at a predetermined controlled timing.

As preferable method for acquiring the air cylinder 1510 is to acquire the air cylinder item 1510 from the position where the iron plate block 1503 is located, by means of, for example, extinguishing a normal block 1550 located below the iron plate block 1503, to thereby cause the iron plate block 1503 to drop to the position from which the normal block 1550 has been extinguished. The air cylinder item 1510 is acquired by means of pressing the action key 256 after the character 360 has been positioned at any one of the upper, lower, left and right sides of the air cylinder item 1510. As a result of acquisition of the air cylinder item 1510, the remaining quantity of air can be increased by 10% of capacity. There can be set a plurality of types of air cylinders, each being assigned a different amount of increase in the quantity of air. The air level indication section AIR 340 shown in FIG. 15 indicates a value of 10%, and the box located below the air level indication section AIR 340 shows the remaining quantity of air by means of painting the majority of the box in white. Here, in a case where the air cylinder item 1510 is acquired, the air level indication section AIR 340 shows, for example, a value of 20%. Further, the game can be set such that the play time of the game is diminished according to the type of item upon the player acquiring the item. In the case of an item which diminishes the play time of the game, the game can be set such that the play time of the game is diminished not when the character 360 acquires the item but when the character 360 comes into contact with the item that has dropped from an elevated position on the screen. Such an item may be moved from a lowered, right, or left position relative to the character 360, as well as from an elevated position on the screen.

Figure 16:
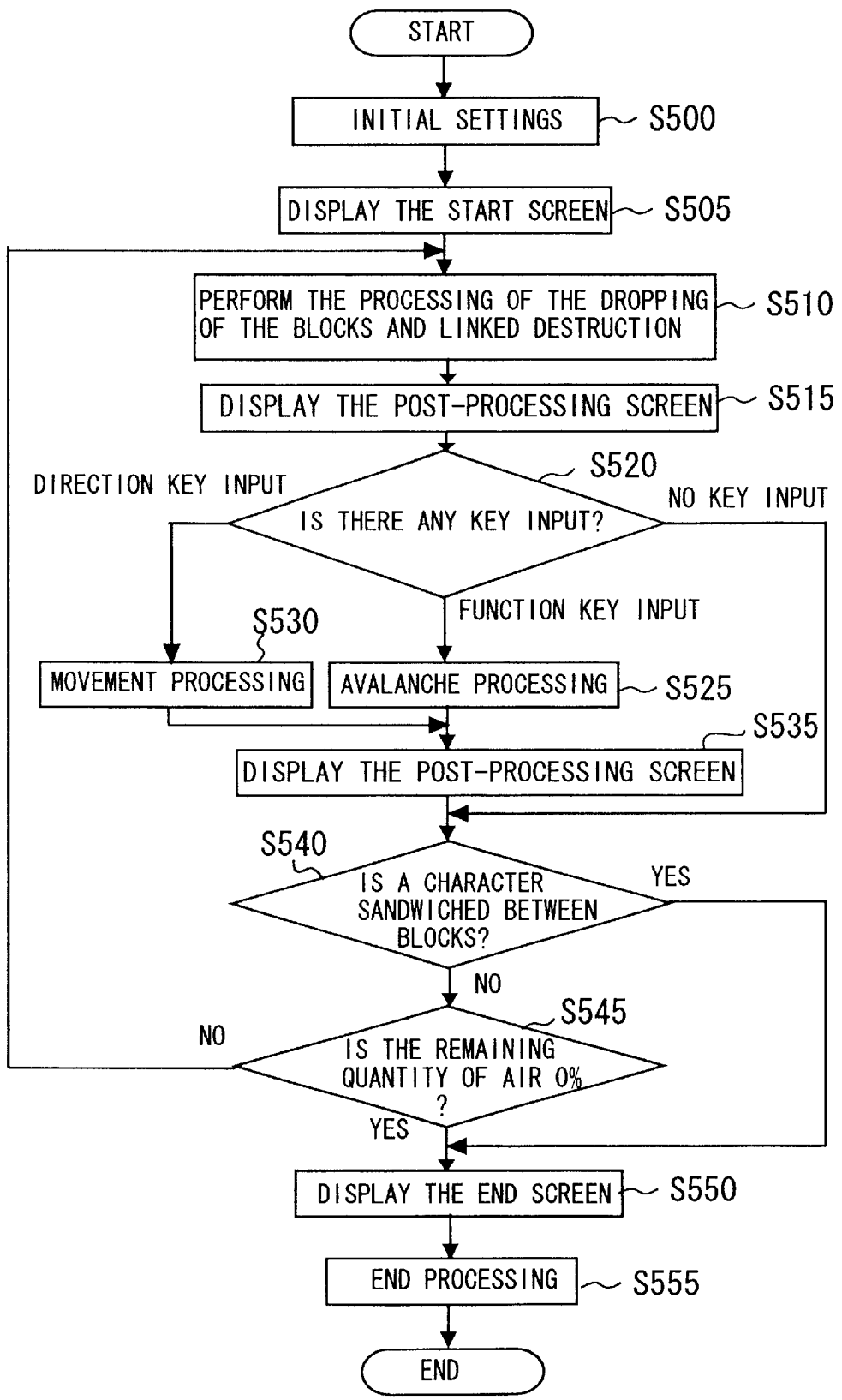
FIG. 16 is a flowchart showing processing relevant to the overall game according to the embodiment 1.

FIG. 16 is a flowchart showing processing relevant to the overall game according to the embodiment 1. As shown in FIG. 16, initial settings with regard to a score, a depth, and a level are designated (step S500), whereupon a start screen including a sign "START!" is displayed (step S505).

Figure 17:
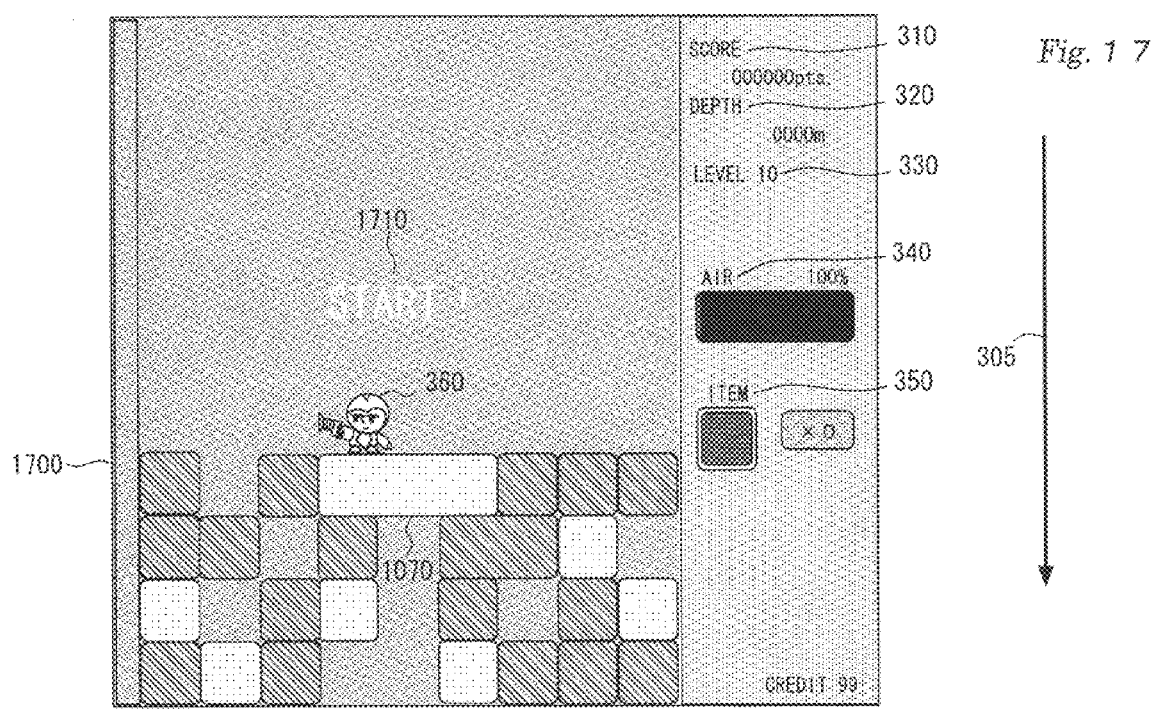
FIG. 17 shows a start screen 1700 of the game according to the embodiment 1.

FIG. 17 shows a start screen 1700 of the game according to the embodiment 1. As shown in FIG. 17, the character 360 is situated on a block 1070, and a start sign 1710 "START!" signifying commencement of a game is displayed on the start screen 1700. The score indication section SCORE 310 displays a score of "000000 pts," and the depth indication section DEPTH 320 displays a depth of "0000 m." The level indication section LEVEL 330 displays a level of "10." The air level indication section AIR 340 displays a value of "100%" as a remaining quantity of air. The box located below the air level indication section AIR 340 shows the remaining quantity of air by means of painting the box in black. The item indication section ITEM 350 shows a value of 0 as the number of items acquired by the character 360.

Turning again to the description of the example shown in FIG. 16, dropping of blocks and the linked destruction processing (steps S240, S250, and S255 shown in FIG. 14) are performed (in step S510). A required post-destruction processing or post-processing screen is displayed (step S515), and a determination is made as to whether or not the player has performed a key entry operation (step S520). In a case where the player has entered an input by means of actuation of the direction key 250 (step S530), the character 360 is moved (step 530). In a case where the player has entered an input by means of actuation of the function key 256 or a like key, the avalanche processing represented by the flowchart shown in FIG. 14 is performed (step S525). In contrast, in a case where a key entry operation is not performed, processing is caused to branch to processing pertaining to step S540. After execution of the movement processing (step S530) or the avalanche processing (step S525), a screen corresponding to the processing is displayed (step S535). A determination is made as to whether or not a character is sandwiched between blocks (step S540). If the character is not sandwiched between blocks, a determination is made as to whether or not the remaining quantity of air assumes a value of 0% (step S545). If the remaining quantity of air is greater than a value of 0%, processing returns to step S510. The above-described processing operations are repeated. In a case where it is determined in step S540 that the character 360 is sandwiched between blocks or where it is determined in step S545 that the remaining quantity of air becomes a value of 0%, an end screen is displayed in step S550. An acquired item is saved, as required (step S555).

Figure 18:
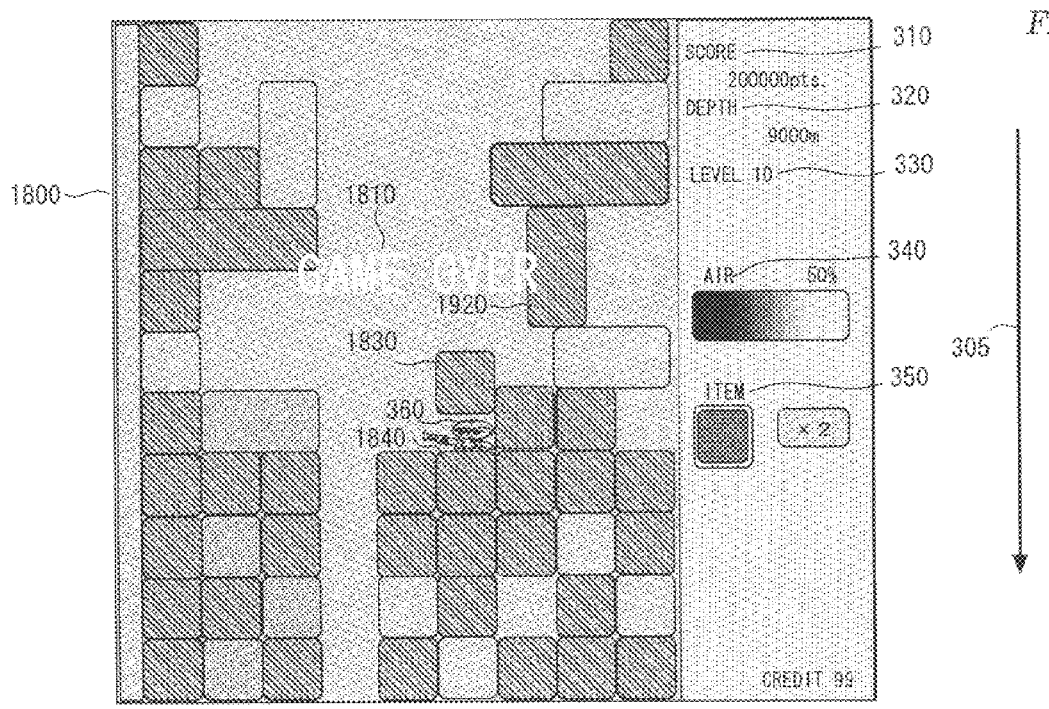
FIG. 18 shows termination processing (sandwich determination means) according to the embodiment 1 and an end screen 1800 of the game.

FIG. 18 shows termination processing (sandwich determination means) according to the embodiment 1 and an end screen 1800 of the game. In a case where the character 360 is sandwiched between a block 1830 that has dropped and a block 1840 located below the character 360 (i.e., step S540 shown in FIG. 16), a termination operation is performed. If it is determined that the game is terminated, a sign 1810 "GAME OVER" signifying termination of the game appears on the screen 1800, whereupon the game is terminated.

Figure 19:
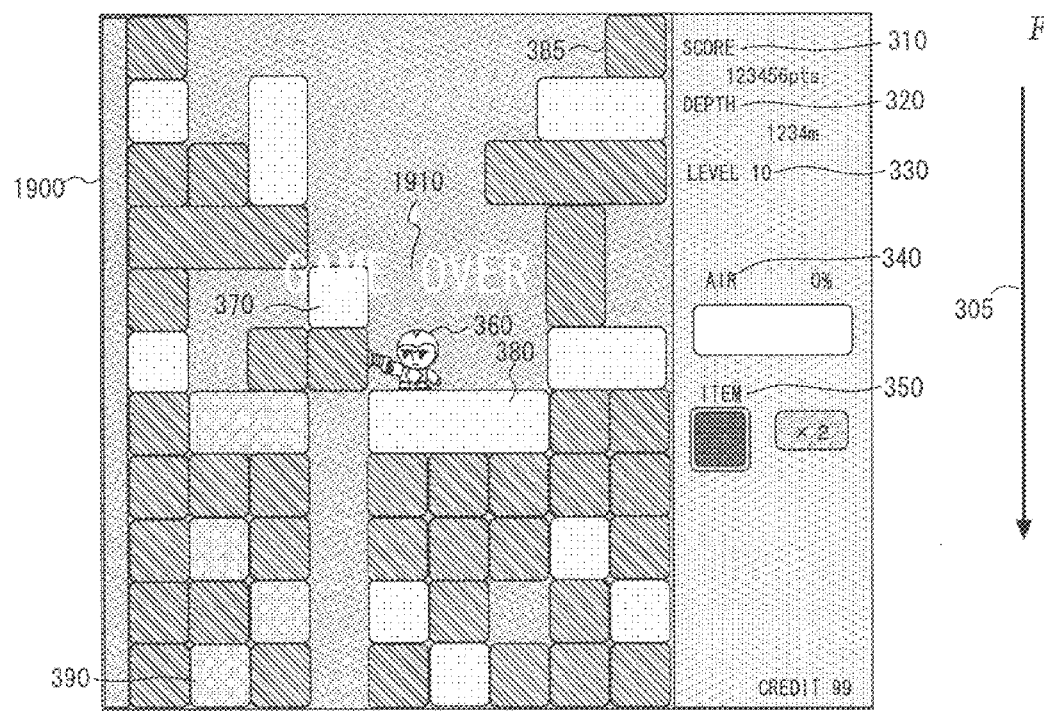
FIG. 19 shows another termination operation (a processing operation arising when the remaining quantity of air becomes a value of 0%), and an end screen 1900 pertaining to an image processing method for use with the game machine.

FIG. 19 shows another termination operation (a processing operation arising when the remaining quantity of air becomes a value of 0%), and an end screen 1900 pertaining to an image processing method for use with the game machine. As indicated in the air level indication section AIR 340 shown in FIG. 19, in a case where the remaining quantity of air becomes a value of 0% (step S545 shown in FIG. 16), termination processing is performed. If it is determined that the game is over, a sign 1910 "GAME OVER" signifying the end of the game appears on the screen 1900, whereupon the game is terminated.

As mentioned above, according to the embodiment 1, an object of operation (i.e., the character 360) which can be moved by the player is set within a screen. In a case where the character is smashed between a dropping block and a block surrounding the character, the game is terminated, thereby providing a sense of tension to the player. Further, a game screen is scrolled in association with movement of the character, thereby posing a dynamic change in the screen.

Embodiment 2

In the scroll processing (i.e., scroll means) according to the embodiment 1, in a case where the character 360 moves beyond the screen 300 (i.e., a display area) further in the direction of drop (a downward direction on the screen 300) or in the direction opposite the direction of drop (i.e., an upward direction on the screen 300) or where the character 360 moves downward or upward on the screen 300 within the display area, the screen is scrolled in the direction of drop (i.e., a downward direction on the screen 300) or the direction opposite the direction of drop (i.e., an upward direction on the screen 300), in which direction the character 360 located within a virtual display area (a virtual space) including the screen 300, or a like screen, moves, wherewith a new screen can be displayed in the direction in which the character 360 moves. In the scroll processing (i.e., scroll means) according to the embodiment 2, in a case where the character 360 moves beyond the screen 300 (i.e., a display area) further in the direction of right or left (a rightward or leftward direction on the screen 300) or where the character 360 moves rightward or leftward on the screen 300 within the display area, the screen is scrolled in the direction of right or left (i.e., a rightward or leftward direction on the screen 300), in which direction the character 360 located within a virtual display area (a virtual space) including the screen 300, or a like screen, moves, wherewith a new screen can be displayed in the direction in which the character 360 moves.

As mentioned above, according to the embodiment 2, the vertical, horizontal, right or left movement of the character within the virtual space can be indicated within a display area on the screen, whereupon a further dynamic change can arise in the screen of the game currently being played.

Embodiment 3

Figure 20A:
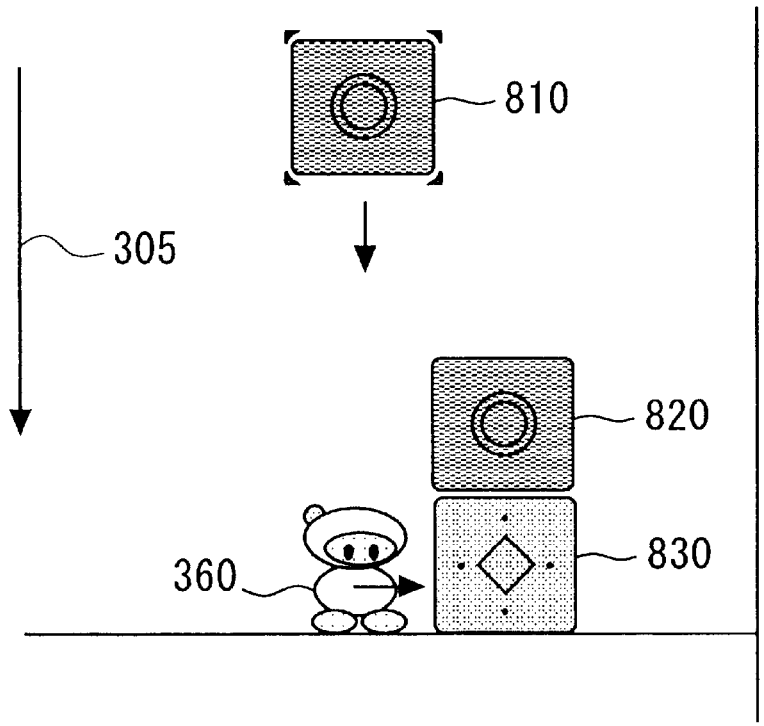
FIGS. 20A and 20B show block drop processing (object drop means) according to an embodiment 3 according to the present invention
Figure 20B:
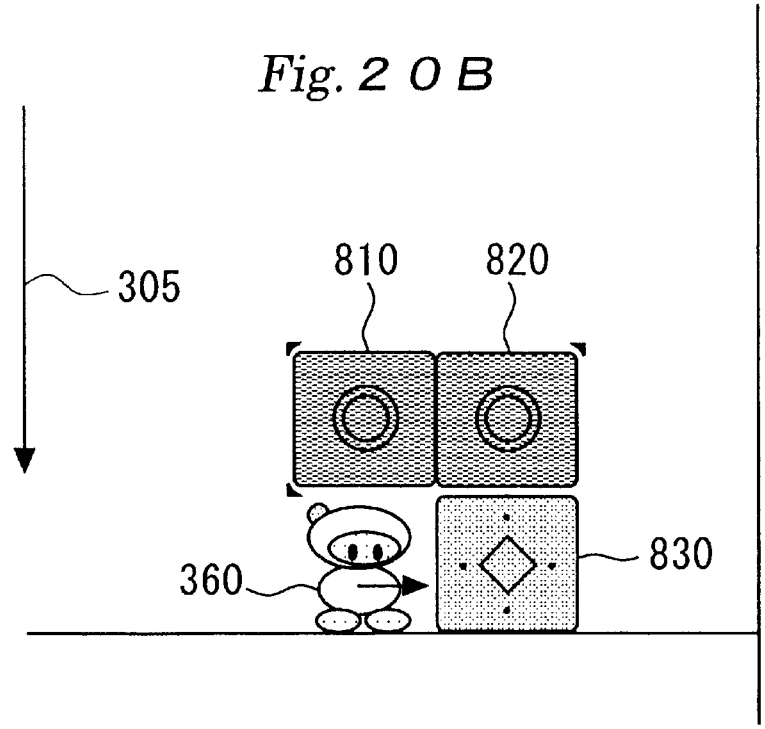

FIGS. 20A and 20B show block drop processing (object drop means) according to an embodiment 3 according to the present invention. Reference numerals 810, 820, and 830 designate blocks; 360 designates a character; and 305 designates a direction in which the block 810 drops. As shown in FIG. 20A, the block 810 situated at a position above the character 360 drops in the direction of drop 305. The block 810 is identical in type with the block 820, and hence the block 820 shown in FIG. 20B is linked with the block 810 that has dropped, thereby preventing further dropping of the block 810. As a result, the block 810 is stopped immediately above the character 360. Thus, as a result of the dropping block passing by a position adjacent another block of the same type, the blocks are linked into a single block, thereby preventing further dropping of the block that has dropped. In a case where the number of blocks integrated into a single block reaches a predetermined number (for example, four) or more, thus-integrated blocks in a linked manner can be destroyed by the above mentioned link destruction processing.

As mentioned above, according to the embodiment 3, in a case where the block that has dropped passes by a position adjacent another block of the same type, the blocks are integrated into a single block, thereby preventing further dropping of the block that has dropped. Thus, the dropping block can be stopped immediately above the character 360, thereby enhancing the sense of tension of the game to a much greater extent.

Embodiment 4

Figure 21A:
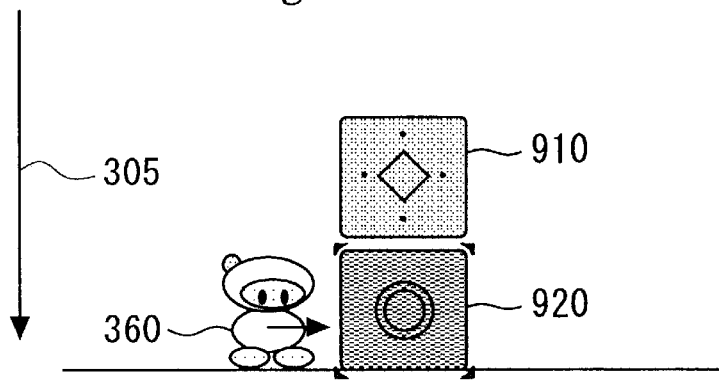
FIGS. 21A to 21D show block drop processing (object drop means) according to an embodiment 4 of the present invention.
Figure 21B:
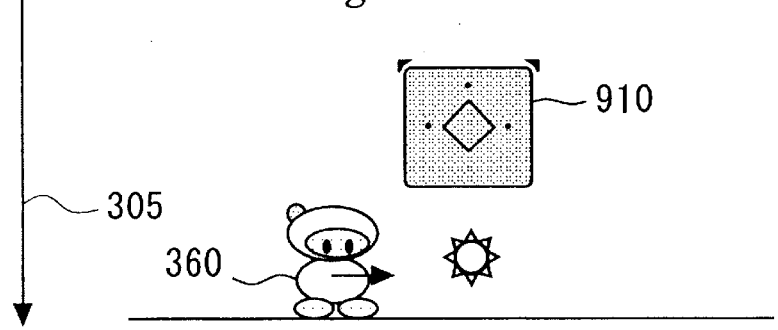
Figure 21C:
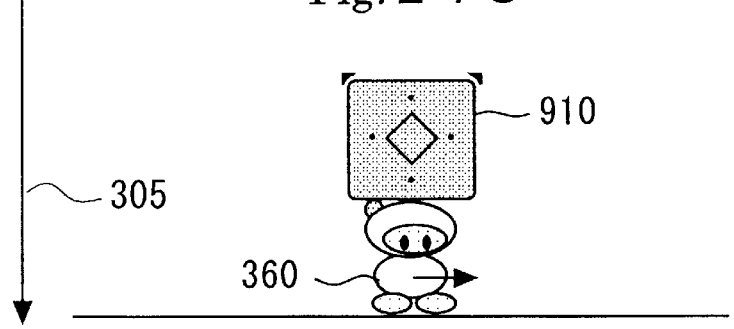
Figure 21D:
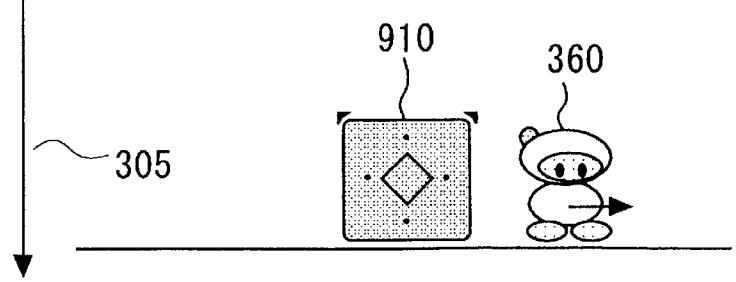

FIGS. 21A to 21D show block drop processing (object drop means) according to an embodiment 4 of the present invention. In FIGS. 21A to 21D, reference numeral 910 and 920 designate blocks; 360 designates a character; and 305 designates a direction in which the block 910 drops. As shown in FIG. 21A, when the character 360 destroys the block 920 located to the right of the character 360, the block 920 is extinguished, as shown in FIG. 21B. Subsequently, dropping of the block 910 commences. However, a time lag of about 1 second can be set such that dropping of the block is not commenced immediately. As a result, as shown in FIGS. 21C and 21D, the character 360 can pass through a position below the block 910 before dropping of the block 910 is effected. The period of the lag time is not limited to one second and can be changed variably.

As set forth, the present embodiment enables setting of a time lag of predetermined period before commencement of dropping of the block, so that the character can pass through a position below the block before drop of the block. Thus, the sense of tension of the game can be enhanced to a much greater extent.

Embodiment 5

In the block drop processing (i.e., object drop means) according to the embodiment 1, the block moves in only the direction of drop 305 (i.e., a direction originating from an elevated position and extending downward on the screen). In contrast, according to the embodiment 5, a block can be moved in the direction opposite the direction of drop 305 (i.e., a direction originating from a lower position and extending upward on the screen). Alternatively, a block can be moved in a horizontal direction on the screen (i.e., from left to right or from right to left). The moving direction of a block; that is, any one of the upper, lower, left and right directions in which a block is to move, can be set to a predetermined direction at the beginning of the game. Further, the direction can be reset to another direction during the course of progress of the game. Further, a plurality of moving directions as well as a single moving direction can be set as the moving direction of a block. Further, an arbitrary direction other than any one of the upper, lower, right, and left directions may be set as the moving direction of a block.

As mentioned above, according to the embodiment 5, the moving direction of a block on the screen may be set to not only a downward direction, but also to an upward direction, a horizontal (left or right) direction, or an arbitrary direction, in combination. As a result, the chance of the character being sandwiched between blocks can be increased, thus enhancing the sense of tension of the game to a much greater extent.

Embodiment 6

A recording medium on which there is recorded a computer program for implementing the functions of the game machines according to the preceding embodiments is supplied to a game machine of the present invention. Needless to say, the object of the present invention is achieved by means of the computer CPU of the game machine reading and executing the computer program stored in the recording medium. In this case, the computer program per se read from the recording medium implements new features of the game machine of the present invention. The recording medium having the computer program recorded thereon constitutes the present invention. For example, a CD-ROM, a floppy disk, a hard disk drive unit, ROM, a memory card, an optical disk, or a like medium can be used as a recording medium having a computer program recorded thereon.

As mentioned above, according to an embodiment 6, a recording medium on which there is recorded a computer program for implementing the features of the game machines according to any of the preceding embodiments is supplied to the game machine of the present invention. The object of the present invention can be accomplished when the computer CPU 110 of the game machine reads and executes a computer program stored on the recording medium.

Embodiment 7

In the previous embodiments, only one controller 240 is illustrated. In contrast, according to an embodiment 7 of the present invention, a plurality of controllers 240 can be employed. As shown in FIG. 2, connection terminals 229 of additional controllers (not shown) other than the controller 240 can be connected to corresponding connection terminals 228, thereby enabling a plurality of players to play a game. For instance, in a case where two players play a game, two screens 700 shown in FIG. 7 appear separately on the display 200, thus enabling execution of a match-type game in which two players compete for a higher score. The game may be executed independently for each player or may be executed such that the players can interfere with each other. For instance, in a case where one of the players has performed the linked destruction processing, blocks which are equal in number to the blocks destroyed through the linked destruction processing can be caused to drop on the other player.

According to the embodiment 7, there may be employed a plurality of controllers, thereby enabling players to perform a match-type game. Consequently, the sense of tension of the game can be enhanced to a much greater extent.

Embodiment 8

In the present embodiment, a match-type game described in the embodiment 7 can be executed over a communications network, such as the Internet. In this case, the game machine can be connected to the communications network, such as the Internet, by means of a communications terminal (not shown) provided in the game machine according to the present invention. Accordingly, the player of the game machine can play a match-type game with the player of another game machine according to the present invention connected to the communications network, such as the Internet. Further, so long as a live cable is connected to the communications terminal, the game machine can also be connected to the communications network, such as the Internet, by way of an ordinary public data network. Alternatively, the game machine can also be connected to the communications network, such as the Internet, by means of a wireless communications device, such as mobile telephone or PHS(personal handyphone system).

As mentioned above, according to the embodiment 8, a match-type game can be played over a communications network, such as the Internet, by use of a communications terminal provided on each of the game machines according to the present invention. Accordingly, players residing in remote locations can play a match game, thereby enhancing the sense of tension of the game to a much greater extent.

Embodiment 9

An embodiment 9 of the present invention relates to a computer data signal embodied in the form of a carrier wave signal. The computer data signal corresponds to computer-readable program code means for executing an image processing method for use with a game machine which moves an object of operation within a virtual space, the virtual space comprising the object of operation, a plurality of types of objects to drop, and a plurality of types of objects surrounding the object of operation. The computer-readable program code means comprises: computer-readable program code means for indicating the status of the object of operation and a display area in the virtual space, the display area comprising the object of operation, the plurality of types of objects to drop, and the plurality of types of objects surrounding the object of operation; computer-readable program code means for causing an object to drop in the virtual space; computer-readable program code means for determining whether or not the object of operation is sandwiched between the object that has dropped and another object located around the object of operation; computer-readable program code means for causing the dropping object to destroy surrounding objects in a linked manner, to thereby extinguish the thus-destroyed objects from the display area; computer-readable program code means for moving the object of operation within the virtual space; and computer-readable program code means for causing the object of operation to destroy surrounding objects, to thereby extinguish the thus-destroyed objects from the display area, wherein the object of operation is prevented from being sandwiched between the object that has dropped and another object around the object of operation, and the object of operation is moved in the direction in which an object drops, by means of destroying surrounding objects.

Embodiment 10

An embodiment 10 of the present invention enables transmission of the computer-readable program code means for executing the image processing method for use with a game machine described in connection with the embodiment 9. In this case, the program code means can be transmitted over a communications network, such as the Internet. Further, the present embodiment enables receipt of the computer-readable program code means over a communications network, such as the Internet. Consequently, so long as the program code means is transmitted to a computer located in a remote place, the program code received by the computer is loaded into a storage device, and a CPU is caused to execute the program code means, thus executing the image processing method for use with a game machine according to the present invention.

Embodiment 11

An embodiment 11 of the present invention relates to a computer program code embodied in the form of a transmission medium. The computer program code is to execute an image processing method for use with a game machine which moves an object of operation within a virtual space, the virtual space comprising the object of operation, a plurality of types of objects to drop, and a plurality of types of objects surrounding the object of operation. The computer program code comprises: computer program code segment means for indicating the status of the object of operation and a display area in the virtual space, the display area comprising the object of operation, the plurality of types of objects to drop, and the plurality of types of objects surrounding the object of operation; computer program code segment means for causing an object to drop in the virtual space; computer program code segment means for determining whether or not the object of operation is sandwiched between the object that has dropped and another object located around the object of operation; computer program code segment means for causing the dropping object to destroy surrounding objects in a linked manner, to thereby extinguish the thus-destroyed objects from the display area; computer program code segment means for moving the object of operation within the virtual space; and computer program code segment means for causing the object of operation to destroy surrounding objects, to thereby extinguish the thus-destroyed objects from the display area, wherein the object of operation is prevented from being sandwiched between the object that has dropped and another object around the object of operation, and the object of operation is moved in the direction in which an object drops, by means of destroying surrounding objects.

Embodiment 12

An embodiment 12 of the present invention enables transmission of the computer program code for executing the image processing method for use with a game machine described in connection with the embodiment 11. In this case, the computer program code can be transmitted over a communications network, such as the Internet. Further, the present embodiment enables receipt of the computer program code over a communications network, such as the Internet. Consequently, so long as the computer program code is transmitted to a computer located in a remote place, the computer program code received by the computer is loaded into a storage device, and a CPU is caused to execute the program code, thus effecting the image processing method for use with a game machine according to the present invention.

As has been described above, the present invention can provide a game machine, an image processing method for use with the game machine, and a recording medium, wherein an object of operation capable of being moved by a player is set within a screen, the game is terminated when the object of operation enters a predetermined situation, to thereby providing a sense of tension, and a screen can be dynamically changed by means of scrolling the screen of a game in accordance with movement of the object of operation.

In the game machine, the display means may further comprise scroll means for displaying a display area through scrolling, when the object of operation has moved within the virtual space.

Here, the game machine may further comprising: item emerging means for causing an item for changing the play time of a game to emerge at a position surrounded by the objects; and item acquisition means for causing the object of operation to acquire the item.

In the game machine, the object drop means may prevent, when a dropping object comes into contact with another object of the same type, further dropping of the dropping object, by causing the dropping object to be integrated with the other object to form a single object.

In the game machine, the object drop means may change the time from when an object supporting another object is destroyed by the surrounding destruction means until the supported object starts dropping.

In the game machine, the object drop means may set the moving direction of an object to a predetermined direction in the virtual space and dynamically switches the predetermined direction.

Here, the image processing method, the display step may further comprise a scroll step for displaying a display area through scrolling, when the object of operation has moved within the virtual space.

Here, the image processing method may further comprise, after the surrounding destruction step; an item emerging step for causing an item for changing the play time of a game to emerge in a position surrounded by objects; and an item acquisition step for causing the object of operation to acquire the item.

In the computer-readable recording medium, the display step may further comprise a scroll step for displaying a display area through scrolling, when the object of operation has moved within the virtual space.

Here, the computer-readable recording medium may further comprise, after the surrounding destruction step; an item emerging step for causing an item for changing the play time of a game to emerge in a position surrounded by objects; and an item acquisition step for causing the object of operation to acquire the item.

The present invention has been described in detail with respect to various embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

The entire disclosure of Japanese Patent Application No. 11-150277 filed on May 28, 1999 including specification, claims, drawings and summary are incorporated herein by reference in its entirety.

What is claimed is:

1. A game machine which moves an object of operation within a virtual space, the virtual space having the object of operation, a plurality of types of objects to drop and a plurality of types of objects surrounding the object of operation, said game machine comprising:

display means for indicating the status of the object of operation and a display area including the object of operation, the plurality of types of objects to drop and the plurality of types of objects surrounding the object of operation in the virtual space;

object drop means for causing an object to drop in the virtual space;

sandwich-state determination means for determining as to whether or not the object of operation is sandwiched between a dropping object and another object located around the object of operation;

linked destruction means for causing a dropping object to destroy surrounding objects in a linked manner, to thereby extinguish the thus-destroyed objects from the display area;

object-of-operation movement means for moving the object of operation within the virtual space; and surrounding object destruction means for causing the object of operation to destroy surrounding objects, to thereby extinguish the thus-destroyed objects from the display area, wherein the object of operation is prevented from being sandwiched between the dropping object and another object around the object of operation, and the object of operation is moved in the direction in which an object drops, by means of destroying surrounding objects.

2. The game machine according to claim 1, wherein said display means further comprises scroll means for displaying a display area through scrolling, when the object of operation has moved within the virtual space.

3. The game machine according to claim 1, further comprising:

item emerging means for causing an item for changing the play time of a game to emerge at a position surrounded by the objects; and item acquisition means for causing the object of operation to acquire the item.

4. The game machine according to any one of claims 1 through 3, wherein said object drop means prevents, when a dropping object comes into contact with another object of the same type, further dropping of the dropping object, by causing the dropping object to be integrated with the other object to form a single object.

5. The game machine according to any one of claims 1 through 3, wherein said object drop means changes the time from when an object supporting another object is destroyed by said surrounding destruction means until the supported object starts dropping.

6. The game machine according to any one of claims 1 through 3, wherein said object drop means sets the moving direction of an object to a predetermined direction in the virtual space and dynamically switches the predetermined direction.

7. An image processing method for use with a game machine which moves an object of operation within a virtual space, the virtual space having the object of operation, a plurality of types of objects to drop and a plurality of types of objects surrounding the object of operation, said method comprising:

a display step for indicating the status of the object of operation and a display area including the object of operation, the plurality of types of objects to drop and the plurality of types of objects surrounding the object of operation in the virtual space;

an object drop step for causing an object to drop in the virtual space;

a sandwich-state determination step for determining as to whether or not the object of operation is sandwiched between the dropping object and another object located around the object of operation;

a linked destruction step for causing a dropping object to destroy surrounding objects in a linked manner, to thereby extinguish the thus-destroyed objects from the display area;

an object-of-operation movement step for moving the object of operation within the virtual space; and a surrounding object destruction step for causing the object of operation to destroy surrounding objects, to thereby extinguish the thus-destroyed objects from the display area, wherein the object of operation is prevented from being sandwiched between the dropping object and another object surrounding the object of operation, and the object of operation is moved in the direction in which an object drops, by means of destroying surrounding objects.

8. The image processing method according to claim 7, wherein said display step further comprises a scroll step for displaying a display area through scrolling, when the object of operation has moved within the virtual space.

9. The image processing method according to claim 7, further comprising, after said surrounding destruction step;

an item emerging step for causing an item for changing the play time of a game to emerge in a position surrounded by objects; and an item acquisition step for causing the object of operation to acquire the item.

10. A computer-readable recording medium which has been stored a computer program for executing an image processing method for use with a game machine which moves an object of operation within a virtual space, the virtual space having the object of operation, a plurality of types of objects to drop and a plurality of types of objects surrounding the object of operation, said method comprising:

a display step for indicating the status of the object of operation and a display area including the object of operation, the plurality of types of objects to drop and the plurality of types of objects surrounding the object of operation in the virtual space;

an object drop step for causing an object to drop in the virtual space;

a sandwich-state determination step for determining as to whether or not the object of operation is sandwiched between the dropping object and another object located around the object of operation;

a linked destruction step for causing a dropping object to destroy surrounding objects in a linked manner, to thereby extinguish the thus-destroyed objects from the display area;

an object-of-operation movement step for moving the object of operation within the virtual space; and a surrounding object destruction step for causing the object of operation to destroy surrounding objects, to thereby extinguish the thus-destroyed objects from the display area, wherein the object of operation is prevented from being sandwiched between the dropping object and another object surrounding the object of operation, and the object of operation is moved in the direction in which an object drops, by means of destroying surrounding objects.

11. The computer-readable recording medium according to claim 10, wherein said display step further comprises a scroll step for displaying a display area through scrolling, when the object of operation has moved within the virtual space.

12. The computer-readable recording medium according to claim 10, further comprising, after said surrounding destruction step;

an item emerging step for causing an item for changing the play time of a game to emerge in a position surrounded by objects; and an item acquisition step for causing the object of operation to acquire the item.

13. A computer data signal embodied in a carrier wave, wherein the computer data signal is computer readable program code means for executing an image processing method for use with a game machine which moves an object of operation within a virtual space, the virtual space comprising the object of operation, a plurality of types of objects to drop, and a plurality of types of objects surrounding the object of operation comprising:

computer-readable program code means for indicating the status of the object of operation and a display area including the object of operation, the plurality of types of objects to drop and the plurality of types of objects surrounding the object of operation in the virtual space;

computer-readable program code means for causing an object to drop in the virtual space;

computer-readable program code means for determining whether or not the object of operation is sandwiched between the dropping object and another object located around the object of operation;

computer-readable program code means for causing a dropping object to destroy surrounding objects in a linked manner, to thereby extinguish the thus-destroyed objects from the display area;

computer-readable program code means for moving the object of operation within the virtual space; and computer-readable program code means for causing the object of operation to destroy surrounding objects, to thereby extinguish the thus-destroyed objects from the display area, wherein the object of operation is prevented from being sandwiched between the dropping object and another object around the object of operation, and the object of operation is moved in the direction in which an object drops, by means of destroying surrounding objects.

14. A computer program code embodied on a transmission medium, the computer program code is to execute an image processing method for use with a game machine which moves an object of operation within a virtual space, the virtual space comprising the object of operation, a plurality of types of objects to drop, and a plurality of types of objects surrounding the object of operation, said computer program code comprising:

computer program code segment means for indicating the status of the object of operation and a display area including the object of operation, the plurality of types of objects to drop and the plurality of types of objects surrounding the object of operation in the virtual space;

computer program code segment means for causing an object to drop in the virtual space;

computer program code segment means for determining whether or not the object of operation is sandwiched between the dropping object and another object located around the object of operation;

computer program code segment means for causing a dropping object to destroy surrounding objects in a linked manner, to thereby extinguish the thus-destroyed objects from the display area;

computer program code segment means for moving the object of operation within the virtual space; and computer program code segment means for causing the object of operation to destroy surrounding objects, to thereby extinguish the thus-destroyed objects from the display area, wherein the object of operation is prevented from being sandwiched between the dropping object and another object around the object of operation, and the object of operation is moved in the direction in which an object drops, by means of destroying surrounding objects.

\* \* \* \* \*